US012275582B2

(12) United States Patent
Collins et al.

(10) Patent No.: US 12,275,582 B2
(45) Date of Patent: Apr. 15, 2025

(54) SORTING APPARATUS FOR SEPARATING A RECEPTACLE INTO MULTIPLE SECTIONS

(71) Applicants: Ryan Collins, Walnut Creek, CA (US); Jill Collins, Walnut Creek, CA (US)

(72) Inventors: Ryan Collins, Walnut Creek, CA (US); Jill Collins, Walnut Creek, CA (US)

( * ) Notice: Subject to any disclaimer, the term of this patent is extended or adjusted under 35 U.S.C. 154(b) by 6 days.

(21) Appl. No.: 18/106,583

(22) Filed: Feb. 7, 2023

(65) Prior Publication Data

US 2023/0294913 A1 Sep. 21, 2023

Related U.S. Application Data

(60) Provisional application No. 63/309,182, filed on Feb. 11, 2022.

(51) Int. Cl.
*B65F 1/06* (2006.01)
*B65F 1/00* (2006.01)

(52) U.S. Cl.
CPC ............ *B65F 1/0033* (2013.01); *B65F 1/067* (2013.01)

(58) Field of Classification Search
CPC ........... B65F 1/06; B65F 1/067; B65F 1/0033
USPC ........... 220/495.06, 495.09, 909, 551, 908.1, 220/23.83, 495.01, 495.11, 500; 248/95
See application file for complete search history.

(56) References Cited

U.S. PATENT DOCUMENTS 4,750,638 A * 6/1988 Sosower .................. B65F 1/06 D34/1
4,905,853 A 3/1990 Strawder
5,183,228 A 2/1993 Curry
5,190,183 A 3/1993 McNaughton et al.
8,950,620 B1 * 2/2015 McDuffie ................ B65F 1/067 220/495.01
2010/0219192 A1 * 9/2010 Quan ...................... B65F 1/067 220/495.08

FOREIGN PATENT DOCUMENTS

CN 112340269 A 2/2021
CN 113023161 A 6/2021
DE 9305483 U1 9/1993
(Continued)

*Primary Examiner* — Don M Anderson
*Assistant Examiner* — Elizabeth J Volz
(74) *Attorney, Agent, or Firm* — Jason H. Vick; Amped IP LLC

(57) ABSTRACT

A sorting apparatus for separating a receptacle into multiple sections includes a first member and a second member. The first member is slidable relative to the second member via respective overlaid portions, and the first member and the second member are configured to engage the receptacle via respective end portions, to secure the sorting apparatus to the receptacle. The sorting apparatus is operable to secure one or more bags or liners within separate sections of a cavity defined within the receptacle, and is operable to increase and/or decrease the volume of the separate sections of the cavity through additional sliding of the sorting apparatus when secured to the receptacle. The one or more bags are usable for separately collecting different types of waste such as trash, compostable material, and recyclables, allowing a user to partition the receptacle and increase ease of collecting compostable material and/or recyclables in addition to trash.

20 Claims, 16 Drawing Sheets

(56) References Cited

FOREIGN PATENT DOCUMENTS

| | | | |
|---|---|---|---|
| NL | 9101840 | A | 6/1993 |
| NL | 2006292 | C2 | 4/2012 |
| WO | WO 2010/011937 | A1 | 1/2010 |

* cited by examiner

SORTING APPARATUS FOR SEPARATING A RECEPTACLE INTO MULTIPLE SECTIONS

CROSS-REFERENCE TO RELATED APPLICATIONS

The present application claims the benefit of and priority, under 35 U.S.C. § 119(e), to U.S. Provisional Application Ser. No. 63/309,182, filed on Feb. 11, 2022, entitled "ECO-SORTER," the entire disclosure of which is hereby incorporated herein by reference, in its entirety, for all that it teaches and for all purposes.

BACKGROUND

The present disclosure is generally directed to a sorting apparatus and, in particular, toward a sorting apparatus that is installable on a receptacle to separate an internal cavity defined within the receptacle into multiple sections.

Composting is an important tool for helping the environment. Approximately 40% of food in the US is wasted annually and over 30% of trash sent to landfills is made of compostable materials. Food waste produces methane as it decomposes in a landfill, which is a greenhouse gas with a warming potential that is 28 times greater than carbon dioxide. Conversely, when food waste is added to soil (e.g., as compost), it helps to improve soil structure, drainage, and water-holding capacity, which can reduce the need for irrigation and fertilizers. Overall, composting kitchen scraps is an effective way to reduce waste in landfills, conserve resources, promote soil health, and reduce greenhouse gas emissions.

The easier it is for people to collect and compost their kitchen scraps, the more likely they are to try it, which can have a great positive impact on our environment. Known solutions for collecting kitchen scraps for composting are limited to small receptacles such as compost pails/cans/bins with an average size of 1-2 gallons. The receptacles typically sit on a kitchen counter or in a cabinet under the sink. These solutions are inconvenient, often unattractive, and outdated. The inconvenience of having to go to a separate receptacle to dispose of compostable items instead leads to many items being put in the trash as the easier alternative. Compost sitting in a receptacle on a counter or under a sink is often undesirable, due to the aesthetics of having compost stored on the counter or under the sink as well as the dedicated counter/cabinet space required for the receptacle.

It is noted that an ever-growing number of cities, counties, and states are offering commercial curbside composting. Unlike backyard composting, commercial composting accepts and can process a wide range of organic material for composting (e.g., such as meat, dairy, paper products, compostable bags, and the like). As a result, current composting receptacles are often too small for the collection of the increasingly larger amount of accepted compostable materials.

Therefore, because a large percentage of what the average person throws away in the trash is compostable, and ease is important for widespread adoption of kitchen compost collection, it would be beneficial to provide a solution for collecting compostable materials at the same location where the trash is being thrown away. As such, it would be beneficial to provide a sorting apparatus for separating a receptacle into multiple separate sections that addresses the known issues, above.

BRIEF SUMMARY

The present disclosure is directed to a sorting apparatus that is installable on a receptacle that separates an internal cavity within the receptacle into multiple separate sections. In particular, the present disclosure is directed to a sorting apparatus that is expandable to fit any desired width or length of a receptacle to create the multiple separate sections. In addition, the sorting apparatus is configured to hold liners or bags in place within the multiple separate sections to create individualized waste sections (e.g., trash sections, composting materials sections, recyclables section, and the like).

In one non-limiting example, the receptacle is divided into at least two separate sections (e.g., one for trash and one for compostable materials, or the like). The multiple separate sections enable the collection of multiple types of waste (e.g., compostable materials and non-compostable materials) at the same place, eliminating the need for a separate compost receptacle and making the collection of kitchen compostable items as easy as throwing items in the trash. The multiple sections of the receptacle (e.g., compostable and non-compostable sections, or the like) are adaptable or modifiable to be larger or smaller depending on the amount of each that the user is putting in the trash, by increasing or decreasing the volume of the cavity defined within the receptacle afforded to each waste type. This is accomplished by adjusting the positioning of the sorting apparatus on the receptacle, which also retains the bags or liners (e.g., regular trash bags, compostable compost bags, or the like) in the cavity defined within the receptacle to form the multiple separate sections.

The sorting apparatus includes a first member and a second member. The first member and the second member each include portions that are at least partially overlaid. The sorting apparatus includes an interlocking assembly to secure the first member to the second member. In some examples, the interlocking assembly allows for the sliding of the overlaid portion of the first member relative to the overlaid portion of the second member when at a first level or degree of tightness, and prevents the sliding of the overlaid portion of the first member relative to the overlaid portion of the second member when at a second, increased level or degree of tightness. The interlocking assembly includes components that are separate from and engage with the first member and the second member (e.g., with apertures and/or slots), and/or includes components that are at least partially integrated or embedded into the first member and the second member.

The first member and the second member each include end portions. The first member may slide relative to the second member between a first configuration and a second configuration (of two or more or a plurality of configurations), such that a total distance between opposing end portions of the first member and the second member is increased or decreased as necessary to allow the end portions of the first member and the second member to engage a receptacle. In the second configuration, the sorting apparatus is retained against (or on) the receptacle. In the first configuration and/or in the second configuration, the sorting apparatus is removable from the receptacle. In some examples, the end portions may be contoured to conform to an exterior surface or external edge or lip of a receptacle. In other example, the end portions may be independently-shaped from the exterior surface or external edge or lip of the receptacle. It is noted the end portions may similarly be contoured to conform to (or be independently-shaped from) accommodate a lid configured to be seated on the receptacle.

In some examples, the end portions of the first member and the second member include notches that are configured to receive and retain portions of a liner or bag. When placed on the receptacle, the notches hold the liner or bag in place relative to the sorting apparatus and to the receptacle, ensuring the separate formation and retention of the multiple separate sections within the receptacle.

The sorting apparatus of the present disclosure allows for an increased container size for compost from the typical smaller compost receptacle, reducing the amount and/or number of times needed to empty the compost receptacle. The sorting apparatus of the present disclosure also allows for the removal of an additional, separate receptacle from a kitchen or other location (e.g., other food preparation area, or the like), such as on the kitchen counter where it may be unattractive when containing kitchen scraps and/or where it may be undesirable by taking valuable counter/cabinet space, or emitting odors. By combining trash and compost into a single receptacle, the sorting apparatus of the present disclosure promotes an increased capture of compost by those who may trash kitchen scraps instead of composting them due to the inconvenience of maintaining an additional receptacle at an additional location within the kitchen or other location (e.g., other food preparation area, or the like). Using an existing receptacle as a repository for multiple types of waste (e.g., trash, compostable materials, recyclables, and the like) allows for an increased ease in collection, which may lead to an increased positive environmental impact as compostable and/or recyclable materials are directed away from landfills and into more suitable areas (e.g., for use as fertilizer, and the like).

The sorting apparatus of the present disclosure provides a positive benefit to a user, encouraging them to try collecting compostable waste by reducing the level to entry, which may lead the user to feel good about their positive actions for the environment. The sorting apparatus of the present disclosure provides a visualized metric for how much plastic may be used or discarded for trash (e.g., in the form of trash bags), and may provide a visualized metric for the amount of kitchen scraps or other compostable material that may be saved from the landfill and instead redirected into compostable areas for alternative uses. This, in turn, may lead to the user changing behaviors such as reducing plastic use and food waste. This is especially beneficial where the user lives in an area that has waste management services who provide curbside composting services in addition to collecting trash and/or recyclables, allowing the user to more easily and actively consider the environment, environmental issues, and/or a zero-waste lifestyle to be more earth-conscious while following available local government mandates.

The sorting apparatus of the present disclosure may be utilized for any combination of trash, compostable materials, and/or recyclables. For example, a user may separate the receptacle for trash and compostable materials, trash and recyclables, recyclables and compostable materials, or the like. Where the receptacle is sufficiently large, multiple sorting apparatuses may be used to separate the internal cavity defined within the receptacle into two, three, or more sections. For example, with two sorting apparatuses the receptacle may be separated into trash, compostable materials, and recyclable sections.

The sorting apparatus of the present disclosure may be utilized in areas other than a kitchen or food preparation area. For example, the sorting apparatus of the present disclosure may be couplable to a receptacle in a bathroom, allowing for the separation of bathroom waste that may be compostable from other, non-compostable waste. By way of another example, the sorting apparatus of the present disclosure may be couplable to a receptacle in a bathroom, allowing for the separation of bathroom waste that may be recyclable from other, non-recyclable waste. Further, the sorting apparatus of the present disclosure may be utilized to separate medical supplies (e.g., needles, at-home test strips or kits, and the like) from other bathroom trash, compostable materials, or recyclables.

In this regard, the sorting apparatus of the present disclosure improves upon or solves many problems that are inherent with the current process of separating compostable materials from other waste such as trash and/or recyclables. The sorting apparatus of the present disclosure is more user-friendly and allows for a lower entry level into composting, which is especially beneficial where a user lives in an area that provides composting services alongside collection of trash and/or recyclables. The sorting apparatus of the present disclosure reduces receptacle count and/or necessary receptable space in a kitchen or other food preparation area, bathroom, or the like. The sorting apparatus of the present disclosure is adaptable for multiple sizes of receptables, and may be used in combination with receptacle lids and/or other sorting apparatuses.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
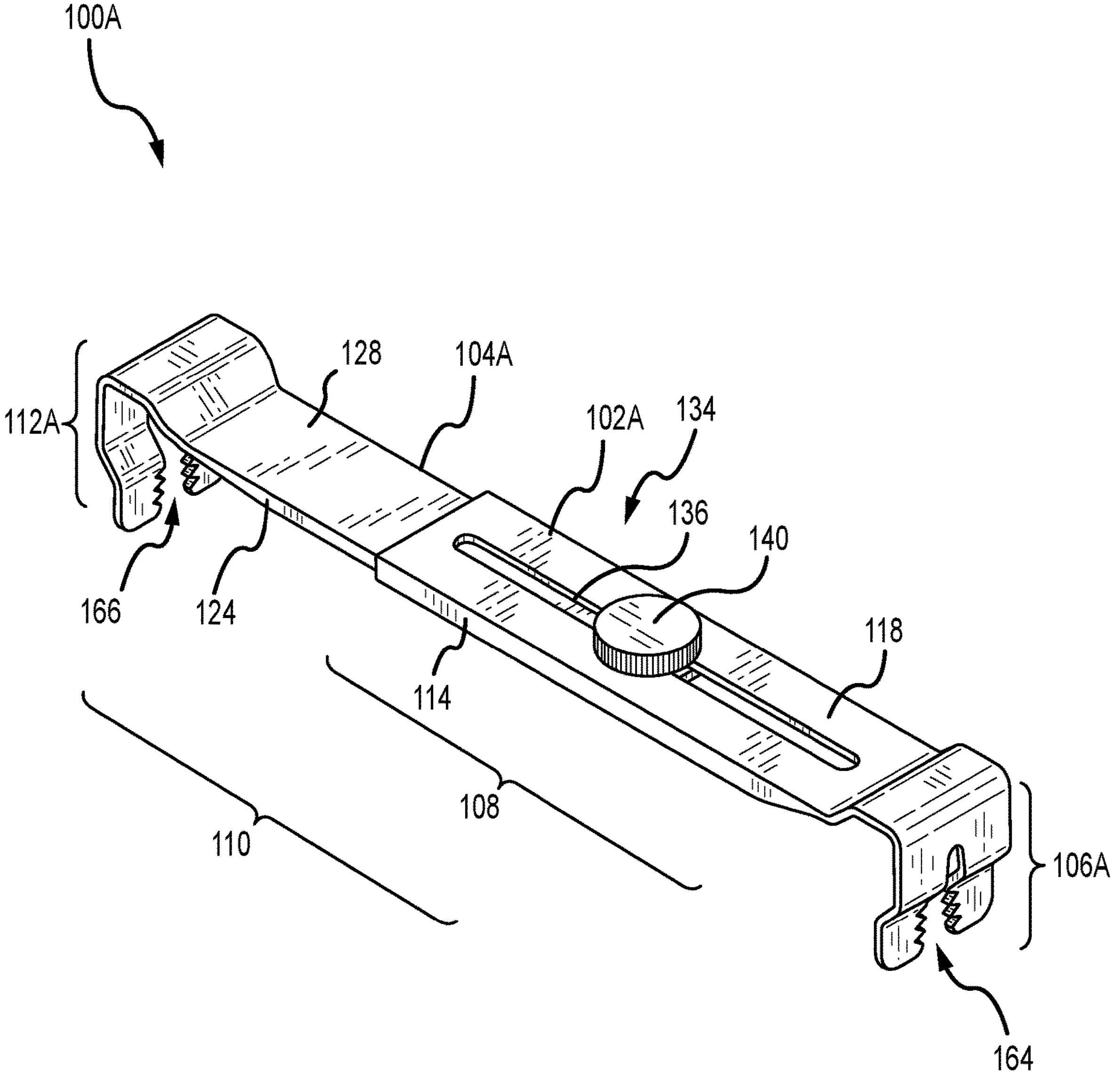
FIG. 1 shows a first perspective view of a first embodiment of a sorting apparatus, in accordance with aspects of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

Current solutions for compost collection include additional receptacles positioned beside the trash receptacle, on a kitchen counter, and/or elsewhere within a food preparation area. The receptacle for compostable materials is often smaller in size than a trash receptacle, and may be unattractive and/or undesirable if placed in a kitchen or food preparation area and containing compostable material. This need for an additional receptacle and/or the size of the additional receptacle may be an inhibitor to a person electing to compost instead of placing all non-recyclable waste in a trash receptacle.

It is with respect to the above issues and other problems that the embodiments presented herein were contemplated.

FIGS. 1-29C generally show exemplary views of a sorting apparatus for separating a receptacle into multiple sections, in accordance with aspects of the present disclosure. In particular, FIGS. 1-8 show a first embodiment of the sorting apparatus 100A, FIGS. 9-16 show a second embodiment of the sorting apparatus 100B, and FIGS. 17-29C show the sorting apparatus 100 with a receptacle 200. Unless otherwise noted, aspects or embodiments directed to the sorting apparatus 100A may be understood as being applicable to the sorting apparatus 100B, and vice versa. Similarly, unless otherwise noted, aspects or embodiments directed to the sorting apparatus 100A and/or 100B may be understood as being applicable to the sorting apparatus 100, and vice versa.

FIGS. 1-8 generally show the sorting apparatus 100A, in accordance with aspects of the present disclosure. The sorting apparatus 100A includes a first member 102A and a second member 104A. When the sorting apparatus 100A is assembled, the first member 102A is at least partially overlaid on the second member 104A, such that each member has an overlaid portion and a separate end portion. For example, the first member 102A includes a first end portion 106A at a proximal end and a first overlaid portion 108 at a distal end. By way of another example, the second member 104A includes a second overlaid portion 110 at a proximal end and a second end portion 112A at a distal end.

In some aspects, to assist in keeping the first member 102A aligned with the second member 104A when the first member 102A slides relative to the second member 104A, the first member 102A may include a front rail 114 and/or a rear rail 116. The front rail 114 and/or the rear rail 116 may extend from and be directed downward from a top surface 118 of the first member 102A. The front rail 114 and/or the rear rail 116 may form a channel 120 with a bottom surface 122 of the first member 102A. In a non-limiting example, at least one of the front rail 114, the rear rail 116, the top surface 118, the channel 120, and/or the bottom surface 122 may be considered a portion of the first overlaid portion 108 of the first member 102A.

In additional aspects, to guide the first member 102A and assist in keeping the first member 102A aligned with the second member 104A when the first member 102A slides relative to the second member 104A, the second member 104A may include a front rail 124 and/or a rear rail 126. The front rail 124 and/or the rear rail 126 may extend from and be directed downward from a top surface 128 of the second member 104A. The front rail 124 and/or the rear rail 126 may form a channel 130 with a bottom surface 132 of the second member 104A. In a non-limiting example, at least one of the front rail 124, the rear rail 126, the top surface 128, the channel 130, and/or the bottom surface 132 may be considered a portion of the second overlaid portion 110 of the second member 104A.

In one non-limiting example, the first overlaid portion 108 of the first member 102A may be of a first width that is equal to or greater than a second width of the second overlaid portion 110 of the second member 104A. For instance, an inner total width of the channel 120 of the first member 102A, as defined by a width of the bottom surface 122 of the first member 102A, may be equal to or greater than an outer total width of the second member 104A as defined by the thicknesses of the front rail 124 and/or the rear rail 126 combined with a width of the top surface 128 of the second overlaid portion 110 of the second member 104A (or only by the width of the top surface 128, where there are no rails 124, 126). Here, the first member 102A may receive the second member 104A within the defined channel 120. In addition, an outer total width of the first member 102A may be greater than the inner total width of the first member 102A, where the width of the bottom surface 122 is additionally combined with the thicknesses of the front rail 114 and/or the rear rail 116.

In another non-limiting example, the second member 104A may be of a greater width than the first member 102A, such that the second member 104A extends outward from underneath the first member 102A when the sorting apparatus 100A is assembled. Here, the first member 102A may only include a single rail 114 or 116 (e.g., for purposes of guiding the sliding of the first member 102A relative to the second member 104A) or no rails. The second member 104A may similarly only include a single rail 124 or 126, or no rails. It is noted the first member 102A may not include either the front rail 114 or the rear rail 116 (e.g., to reduce manufacturing costs), without departing from the scope of the present disclosure. Similarly, it is noted the second member 104A may not include either of the front rail 124 or the rear rail 126 (e.g., in order to reduce manufacturing costs), without departing from the scope of the present disclosure.

Although aspects of the present disclosure are directed to downward rails 114, 116, 124, 126, it is noted that the rails 114, 116 and/or the rails 124, 126 may be directed upward from the respective top surfaces 118, 128. For example, the channel 120 may have a total inner width that accepts the rails 124, 126 extending either a downward direction or an upward direction. By way of another example, where the rails 124, 126 extend upward, the first member 102A may not have rails 114, 116, the outer total width of the first member 102A may be less than the inner total width of the second member 104A, or the rails 114, 116 of the first member 102A may alternatively extend upward in a similar fashion such that the first member 102A fits within a channel defined by the rails 124, 126 and the top surface 128 of the second member 104A.

The first member 102A and the second member 104A are connected together by an interlocking assembly 134. In some aspects, the interlocking assembly 134 includes a first slot or aperture 136 within the first member 102A and a second slot or aperture 138 within the second member 104A. An adjuster 140 is insertable into the first slot or aperture 136 of the first member 102A and the second slot or aperture 138 of the second member 104A from a first direction (e.g., downward through the top surface 118 of the first member 102A), and a receiver 142 is positioned on the opposite side of the sorting apparatus 100A to receive the adjuster 140 (e.g., proximate to the bottom surface 132 of the second member 104A). In one non-limiting example, the adjuster 140 may be a threaded fastener or knob, and the receiver 142 may be a nut or other insert. In another non-limiting example, the adjuster 140 may be a non-threaded fastener with a collar or pass-through hole, and the receiver 142 may be a c-clip or cotter pin configured to engage with the non-threaded fastener. In a further non-limiting example, the first slot or aperture 136 and/or the second slot or aperture 138 may be threaded to engage with a threaded fastener adjuster 140, or the adjuster 140 may be otherwise configured to engage the first slot or aperture 136 and/or the second slot or aperture 138. Here, the receiver 142 may not be required in the interlocking assembly 134. In a further non-limiting example, the adjuster 140 may include a toggle such as a lever, button, switch, or other device operable to engage and disengage the adjuster 140 from the receiver 142 or other component within the interlocking assembly 134. In general, any combination of threading, non-threading, protrusions and recesses, or other means of engaging may be usable within the interlocking assembly 134 to couple the first member 102A to the second member 104A.

In some aspects, where the interlocking assembly 134 includes the adjuster 140 and the receiver 142, the adjuster 140 secures the first member 102A to the second member 104A via the receiver 142. To determine the correct total inner width between the end portions 106A, 112A for the sorting apparatus 100A, the interlocking assembly 134 allows for the sliding of the first member 102A relative to the second member 104A when the adjuster 140 is at a first level or degree of tightness within the receiver 142 (e.g., such that the sorting apparatus 100A is unlocked). This ability to increase or decrease the total inner width between the end portions 106A, 112A to expand or contract the sorting apparatus 100A allows the sorting apparatus 100A to accommodate and be installed on a large variety of different-sized receptacles.

Once the correct overall inner width between the end portions 106A, 112A has been determined and the sorting apparatus 100A is installed on a receptacle, the tightness of the adjuster 140 within the receiver 142 may be increased to a second level of tightness (e.g., such that the sorting apparatus 100A is locked). This increased second level of tightness may draw the first member 102A and the second member 104A together, preventing the sliding of the first member 102A relative to the second member 104A via an increased force or friction being applied to the top surface 118 of the first member 102A by the adjuster 140, between the bottom surface 122 of the first member 102A and the top surface 128 of the second member 104A, and/or to the bottom surface 132 of the second member 104A by the receiver 142.

Figure 2:
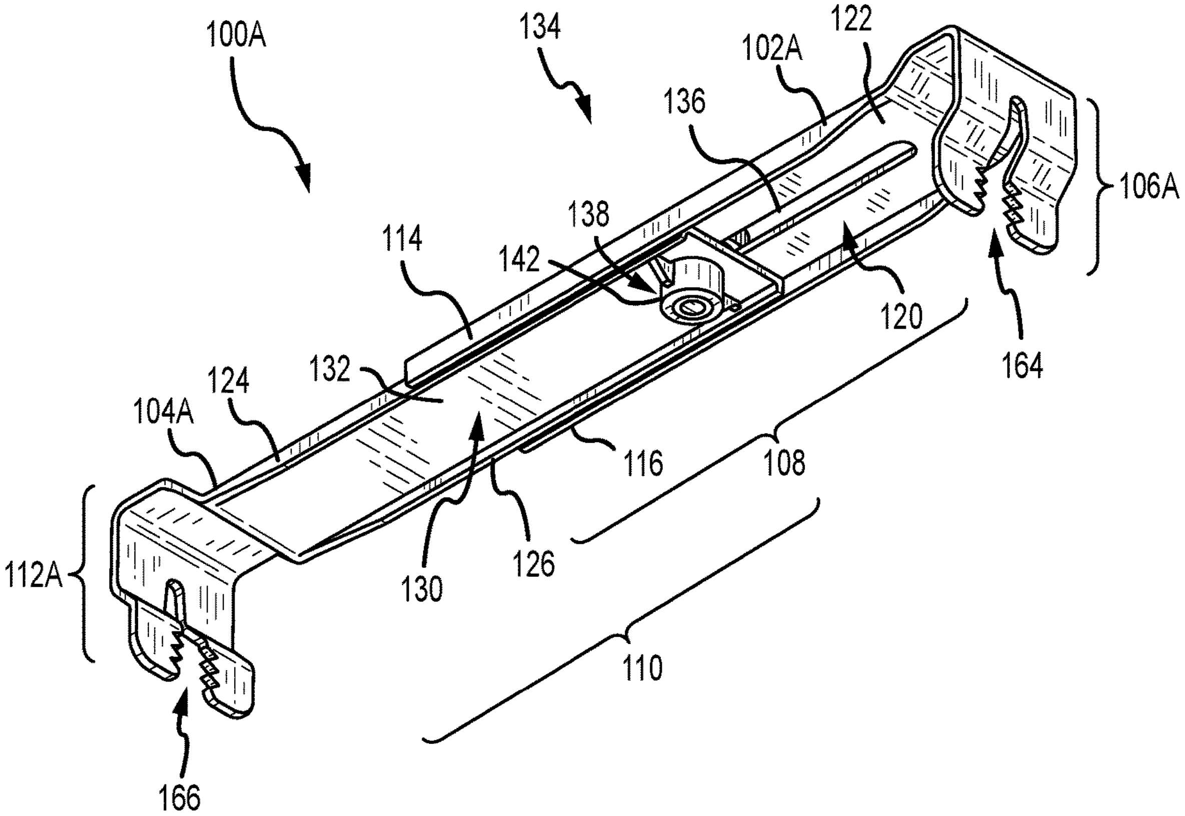
FIG. 2 shows a second perspective view of the sorting apparatus of FIG. 1, in accordance with aspects of the present disclosure.
Figure 8:
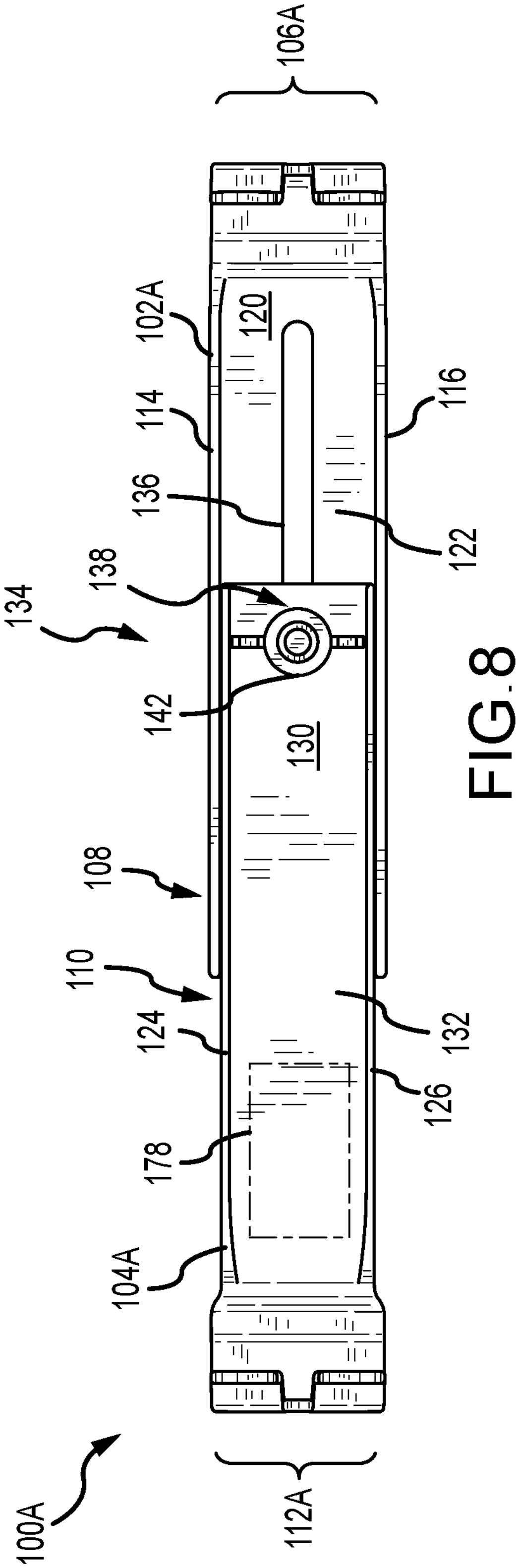
FIG. 8 shows a bottom plan view of the sorting apparatus of FIG. 1, in accordance with aspects of the present disclosure.
Figure 9:
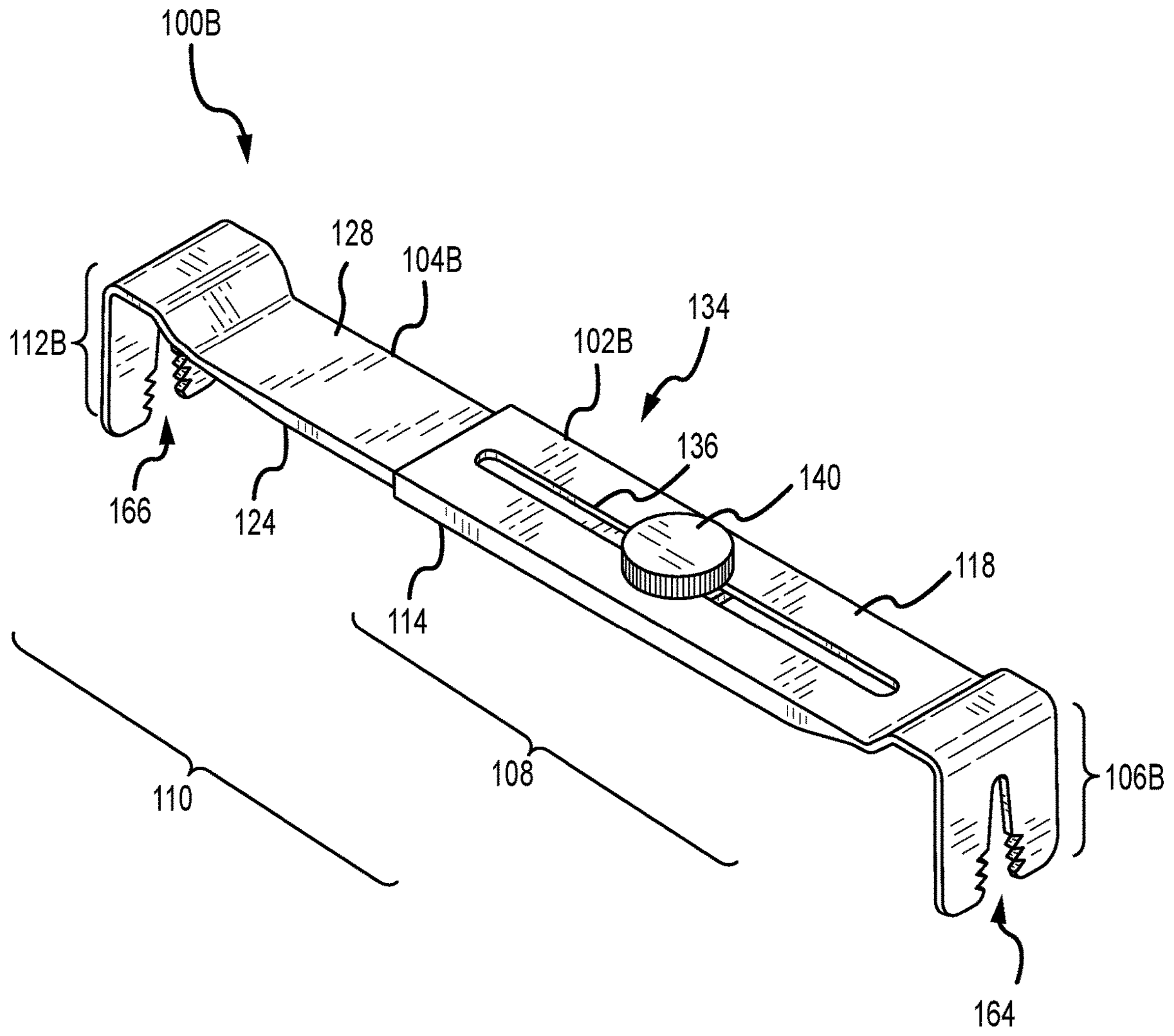
FIG. 9 shows a first perspective view of a second embodiment of a sorting apparatus, in accordance with aspects of the present disclosure.
Figure 10:
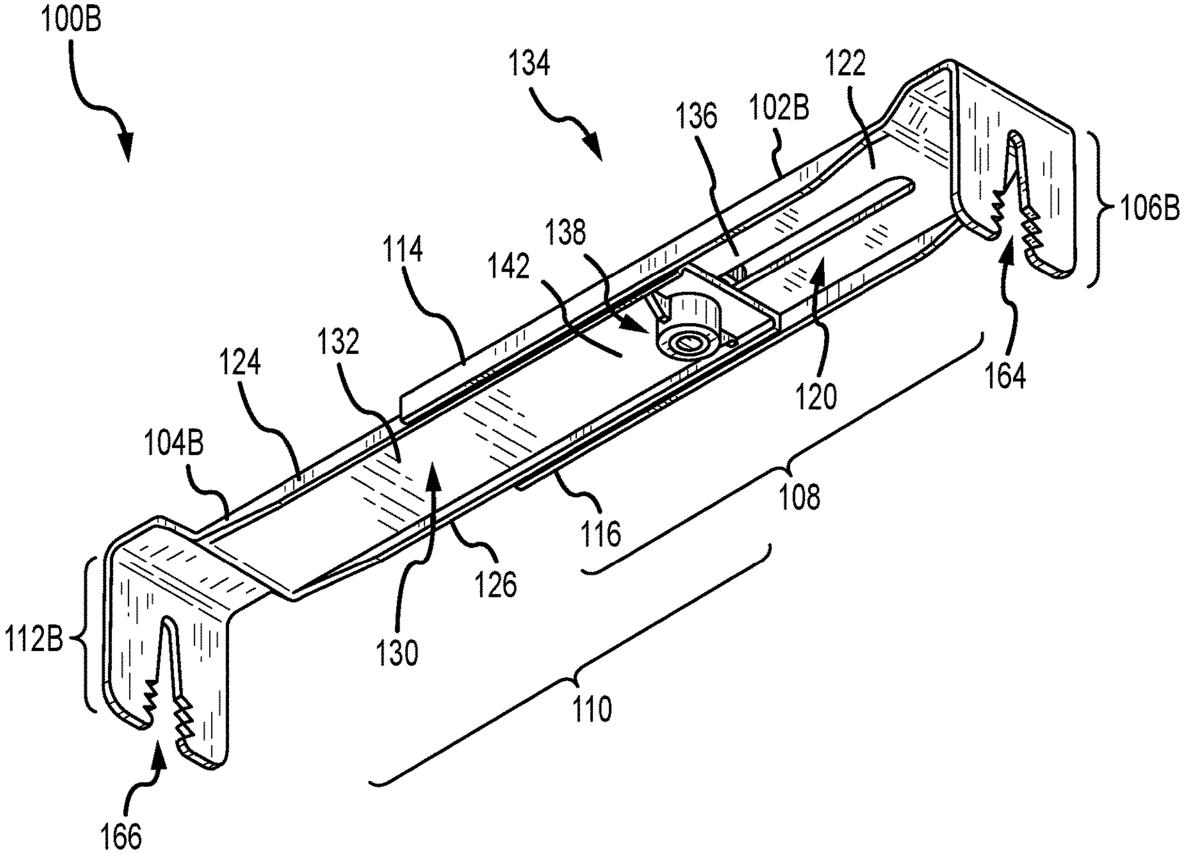
FIG. 10 shows a second perspective view of the sorting apparatus of FIG. 9, in accordance with aspects of the present disclosure.
Figure 11:
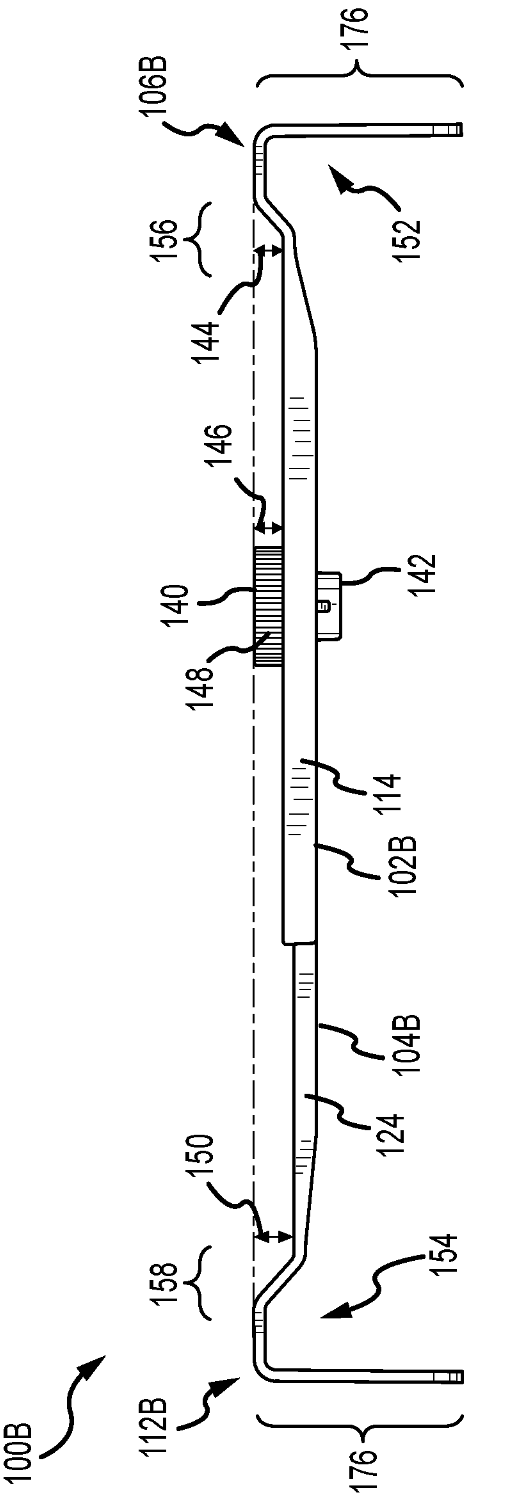
FIG. 11 shows a front elevation view of the sorting apparatus of FIG. 9, in accordance with aspects of the present disclosure.
Figure 12:
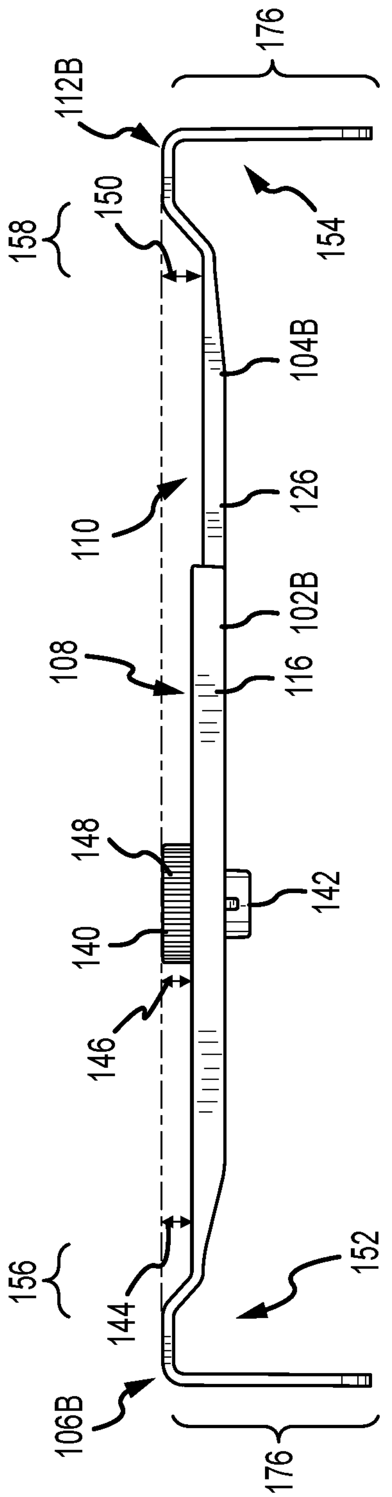
FIG. 12 shows a rear elevation view of the sorting apparatus of FIG. 9, in accordance with aspects of the present disclosure.
Figure 13:
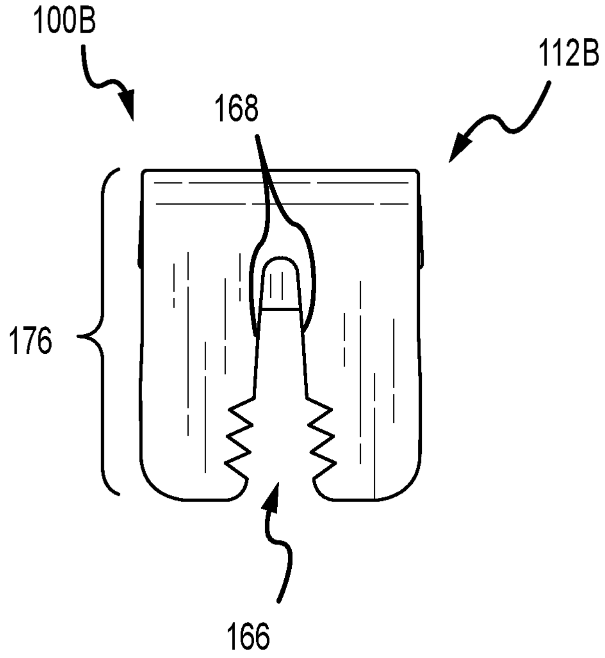
FIG. 13 shows a left end elevation view of the sorting apparatus of FIG. 9, in accordance with aspects of the present disclosure.
Figure 14:
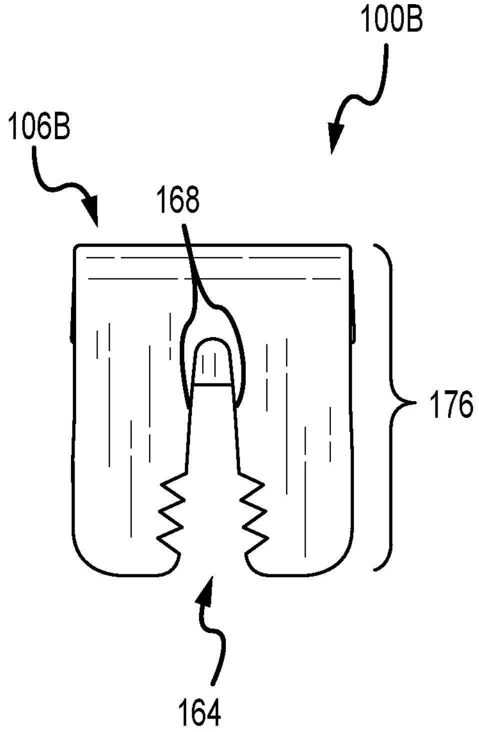
FIG. 14 shows a right end elevation view of the sorting apparatus of FIG. 9, in accordance with aspects of the present disclosure.
Figure 15:
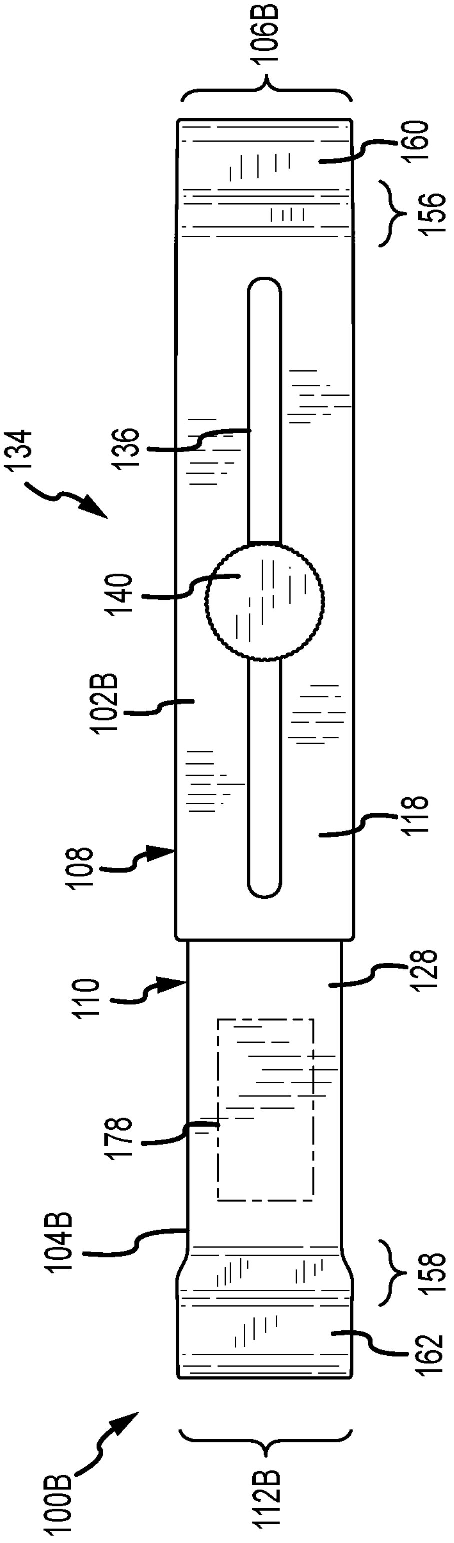
FIG. 15 shows a top plan view of the sorting apparatus of FIG. 9, in accordance with aspects of the present disclosure.
Figure 16:
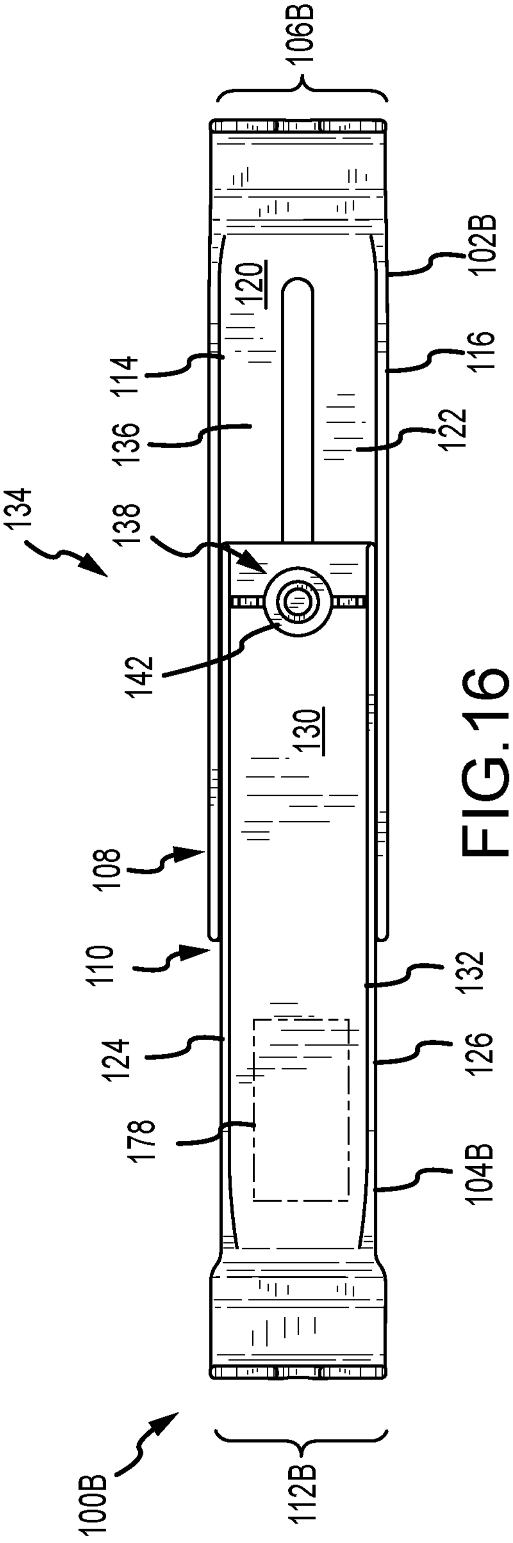
FIG. 16 shows a bottom plan view of the sorting apparatus of FIG. 9, in accordance with aspects of the present disclosure.

In some aspects, as shown in FIGS. 2 and 8 (and FIGS. 10 and 16, described in detail further herein), where the interlocking assembly 134 includes the adjuster 140 and the receiver 142, the receiver 142 may be integrated with or at least partially embedded within the channel 130 (or bottom surface 132) of the second member 104A, securing the receiver 142 to the second member 104A. This would allow a user to engage the receiver 142 with the adjuster 140 through the slots or apertures 136, 138 without needing to hold all components of the sorting apparatus 100A together during the engagement process. However, it is noted that the receiver 142 may be a separate component from the second member 104A (e.g., to reduce manufacturing costs associated with the forming the embedding aspects of the second member 104A), without departing from the scope of the present disclosure. In addition, it is noted that the adjuster 140 may be inserted from the bottom of the second member 104A and the first member 102A, such that the receiver 142 is positioned on the top surface 118 of the first member 102A. Here, the adjuster 140 may be integrated with or at least partially embedded within the channel 130 (or bottom surface 132) of the second member 104A, securing the adjuster 140 to the second member 104A and allowing a user to engage the adjuster 140 with the receiver 142 without needing to hold all components of the sorting apparatus 100A together during the engagement process.

Figure 3:
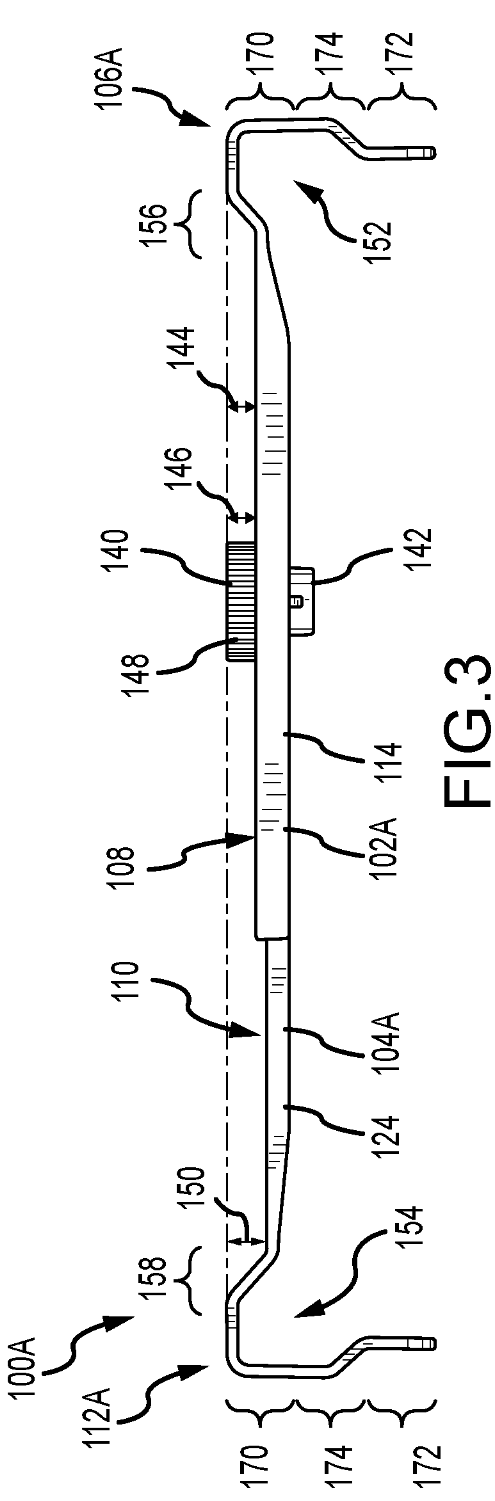
FIG. 3 shows a front elevation view of the sorting apparatus of FIG. 1, in accordance with aspects of the present disclosure.
Figure 4:
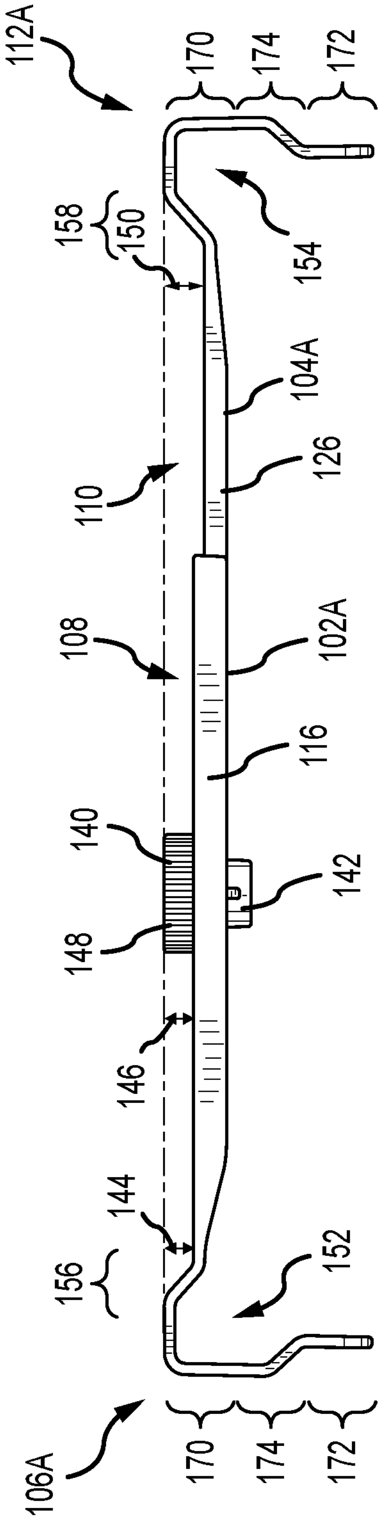
FIG. 4 shows a rear elevation view of the sorting apparatus of FIG. 1, in accordance with aspects of the present disclosure.
Figure 29A:
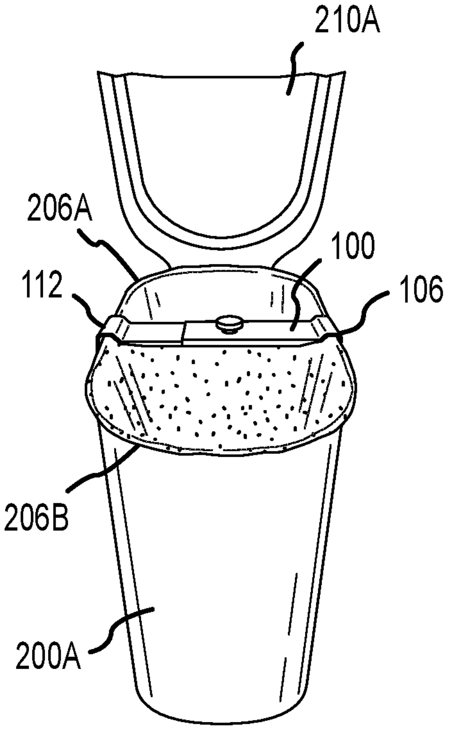
FIG. 29A shows a first variation of a system including the receptacle, the sorting apparatus, two bags or liners, and a lid, in accordance with aspects of the present disclosure.
Figure 29B:
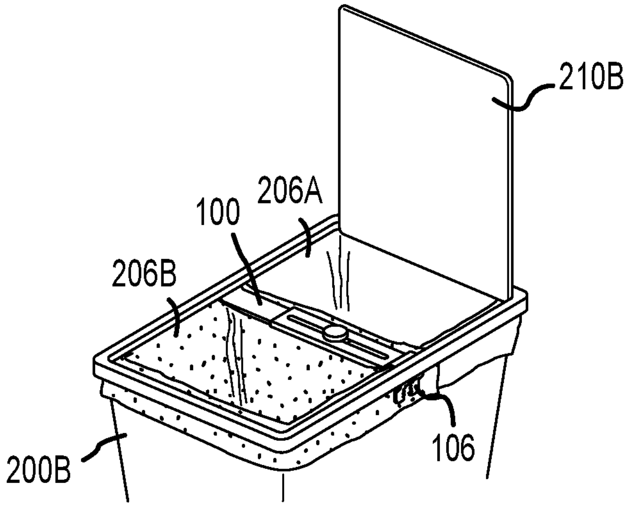
FIG. 29B shows a second variation of a system including the receptacle, the sorting apparatus, two bags or liners, and a lid, in accordance with aspects of the present disclosure.
Figure 29C:
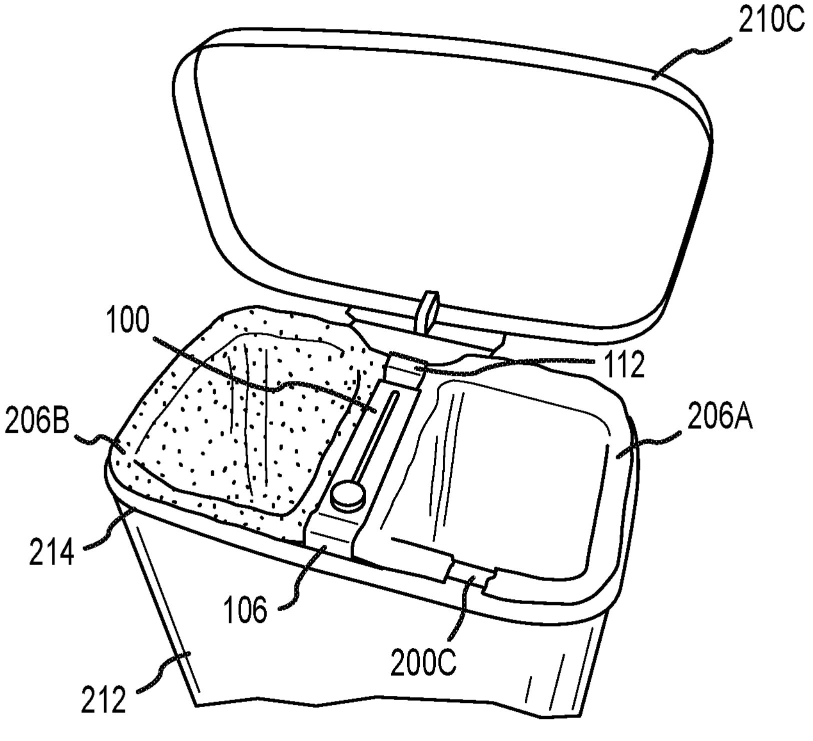
FIG. 29C shows a third variation of a system including the receptacle, the sorting apparatus, two bags or liners, and a lid, in accordance with aspects of the present disclosure.

Referring now to FIGS. 3 and 4 (and FIGS. 11 and 12, described in detail further herein), in some aspects, where the interlocking assembly 134 includes the adjuster 140 and the receiver 142, the first overlaid portion 108 of the first member 102A may have a depth 144 that is equal to or greater than a height 146 of a portion 148 of the adjuster 140 (e.g., a head, where the adjuster 140 is a fastener) that extends above the top surface 118 of the first member 102A. In addition, the second overlaid portion 110 of the second member 104A may have a depth 150 that is equal to or greater than the height 146 of the portion 148 of the adjuster 140. In non-limiting examples where the second member 104A is positioned within the channel 120 of the first member 102A, such that the second member 104A is at least partially beneath the first member 102A, the depth 150 of the second overlaid portion 110 of the second member 104A is greater than the depth 144 of the first overlaid portion 108 of the first member 102A. This is beneficial, especially where the sorting apparatus 100A is coupled to a receptacle with a lid so that the adjuster 140 of the sorting apparatus 100A does not interfere with the lid (e.g., as shown in FIGS. 29A-29C and described in detail further herein). It is noted that, in instances where the adjuster 140 is inserted into the members 102A, 104A from the bottom such that the receiver 142 is on the top surface of the first member 102A, a height of the receiver 142 is similarly dimensioned to be equal to or less than the depths 144, 150 of the overlaid portions 108, 110 respectively, without departing from the scope of the present disclosure.

It is noted that the depth 144 of the first overlaid portion 108 may have a corresponding first groove or cavity 152 defined by the first end portion 106A of the first member 102A. Similarly, it is noted that the depth 150 of the second overlaid portion 110 may have a corresponding second groove or cavity 154 defined by the second end portion 112A of the second member 104A. The grooves or cavities 152, 154 are operable to receive and engage with an upper lip or edge of the receptacle, causing the end portions 106A, 112A to at least partially wrap around the upper lip or edge to secure the sorting apparatus 100 on the receptacle. It should be understood that the configuration of the end portions 106A, 112A and the formed grooves or cavities 152, 154 are not intended to be limiting, and that the end portions 106A, 112A and the formed grooves or cavities 152, 154 may be configured for any upper lip or edge of a receptacle (and/or corresponding lid for the receptacle) as desired, without departing from the scope of the present disclosure.

In some aspects, the first member 102A includes a first transition surface 156 between the first end portion 106A and the first overlaid portion 108, and/or the second member 104A includes a second transition surface 158 between the second overlaid portion 110 and the second end portion 112A. The transition may be gradual or sloped, where the transition surfaces 156, 158 forms non-right angles with the respective end portions 106A, 112A and respective overlaid portions 108, 110. Alternatively, and without departing from the scope of the present disclosure, the transition may be substantially immediate, where the transition surfaces 156, 158 forms right angles (or substantially right angles) with the respective end portions 106A, 112A and respective overlaid portions 108, 110.

In one non-limiting example, the transition surfaces 156, 158 lower the overlaid portions 108, 110 the respective depths 144, 150 into the cavity of the receptacle, the cavity and the receptacle being defined in detail further herein. This allows for a lid of the receptacle to still be attached to or installed on the receptacle while the sorting apparatus 100A is coupled to the receptacle. In this regard, top surfaces 160, 162 of the respective end portions 106A, 112A may be in a different plane from the top surfaces 118, 112A of the overlaid portions 108, 110. It is noted, however, that the top surface 160 of the end portion 106A and the top surface 118 of the overlaid portion 108 may be in the same plane, and/or the top surface 162 of the end portion 112A and the top surface 128 of the overlaid portion 110 may be in the same plane, such that the respective transitions surfaces 156 and/or 158 are not necessary, without departing from the scope of the present disclosure.

Although aspects are directed to a separate adjuster 140 and receiver 142 coupling the first member 102A and the second member 104A together, it is noted that the interlocking assembly 134 may include components that are at least partially integrated with the first member 102A and/or the second member 104A, without departing from the scope of the present disclosure. For example, a protrusion may be formed with or coupled to the first member 102A that may be generally received by a recess, slot, or apertures within the second member 104A. By way of another example, a protrusion may be formed with or coupled to the second member 104A that may be generally received by a recess, slot, or apertures within the first member 102A. By way of another example, the bottom surface 122 of the first member 102A and the top surface 128 of the second member 104A may have interlocking features that engage together.

By way of another example, the rails 114/124 and/or rails 116/126 may have interlocking features that engage together. Although aspects of the present disclosure are directed to downward rails 114, 116, 124, 126, it is noted that the rails 114, 116 may extend outward in a same plane as the top surface 118 of the first member 102A and/or the rails 124, 126 may extend outward in a same plane as the top surface 128 of the second member 104A. For instance, the rails 114, 116 may form inward-facing channels or rails (e.g., U-shaped, V-shaped, or other two-dimensional cross-sectional shape known in the art), and the rails 124, 126 may extend outward in the same plane as the top surface 128 of the second member 104A. The rails 124, 126 may fit within the channels or rails 114, 116 such that the first overlaid portion 108 of the first member 102A at least partially encloses the second overlaid portion 110 of the second member 104A on at least three sides (e.g., the top surface 128, the bottom surface 132, and a front surface and/or a rear surface of the second member 104A depending on number of corresponding rail sets). In addition, the rails 124, 126 may form inward-facing channels or rails (e.g., U-shaped, V-shaped, or other two-dimensional cross-sectional shape known in the art), and the rails 114, 116 may extend outward in the same plane as the top surface 118 of the first member 102A. The rails 114, 116 may fit within the channels or rails 124, 126 such that the second overlaid portion 110 of the second member 104A at least partially encloses the first overlaid portion 108 of the first member 102A on at least three sides (e.g., the top surface 118, the bottom surface 122, and a front surface and/or a rear surface of the first member 102A depending on number of corresponding rail sets). Here, the interlocking assembly may not be necessary or required to further cause the second member 104A to be secured to the first member 102A, and/or may be integrated into the rails (e.g., such as a ratcheting or tab-and-tooth feature).

Figure 5:
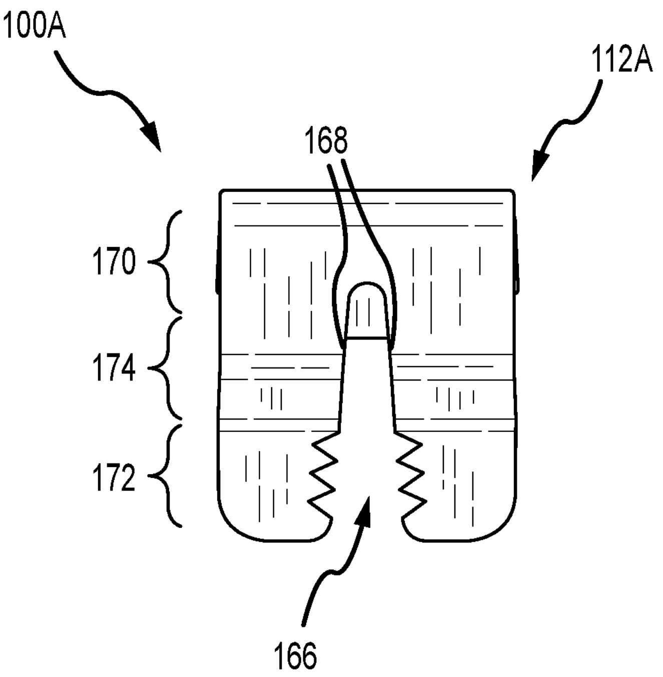
FIG. 5 shows a left end elevation view of the sorting apparatus of FIG. 1, in accordance with aspects of the present disclosure.
Figure 6:
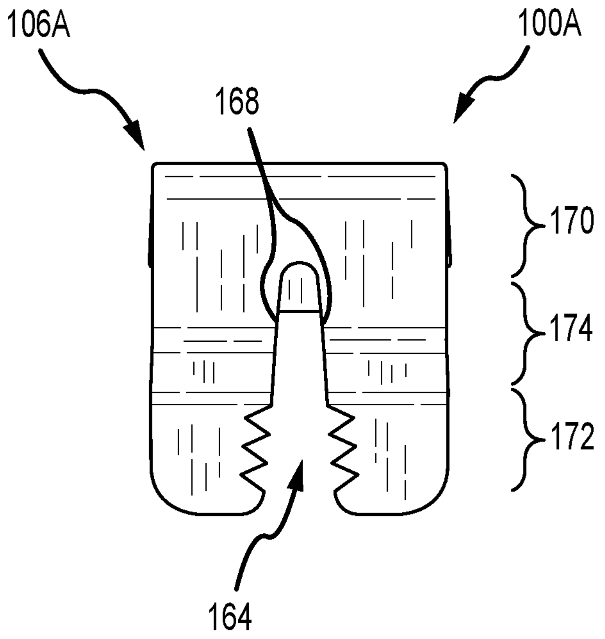
FIG. 6 shows a right end elevation view of the sorting apparatus of FIG. 1, in accordance with aspects of the present disclosure.
Figure 7:
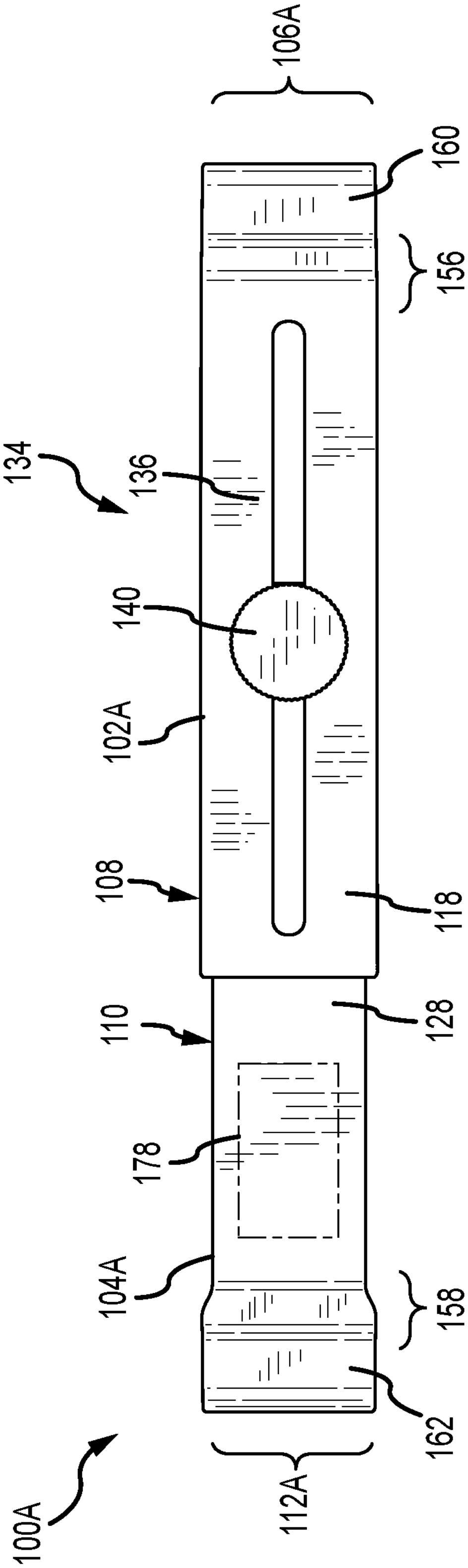
FIG. 7 shows a top plan view of the sorting apparatus of FIG. 1, in accordance with aspects of the present disclosure.

Referring now to FIGS. 5 and 6 (and FIGS. 13 and 14, described in detail further herein), in some aspects, the first end portion 106A of the first member 102A includes a notch 164 and/or the second end portion 112A of the second member 104A includes a notch 166 to assist in securing the bags or liners to the receptacles. The bags or liners may be passed through or otherwise engage with the notches 164, 166 to secure the bags or liners across the entirety of the cavity defined within the receptacle, providing an additional securing feature to compensate for the upper lip or edge on a side (or sides) of the receptacle when multiple bags or liners are installed. In one non-limiting example, the notches 164, 166 are slotted or downward V-shaped and exit through a side edge of the respective end portions 106A, 112A, to cause the bags or liners to tightly secure within the point of the slot or the V. In another non-limiting example, the notches 164, 166 are slots or apertures in the respective end portions 106A, 112A, through which the bags or liners may be pushed through. To further secure the bags or liners, the notches 164, 166 may be shaped and/or include a patterned interior edge 168 that engages with the bags or liners. In a non-limiting example, the interior edges 168 of the notches 164, 166 are patterned (e.g., with a sawtooth design, with hooks or points, or the like) to further cause the bags or liners to engage with the notches 164, 166 when inserted. In this regard, the combination of the respective end portions 106A, 112A pressing down on the bags or liners against the upper lips or edges of the receptacles, and the notches 164, 166 receiving the bags or liners, secure the bags or liners within the receptacles despite the loss of a side (or sides) of the receptacle with which to engage for each respective bag or liner. It is noted that the interior edges 168 may be symmetrical or asymmetrical within a particular notch 164 or 166 and/or between the notches 164, 166. In addition, it is noted that use of the notches 164, 166 may not be required where the bags or liners are sufficiently intertwined (e.g., via a rolling motion) to support one another and the sorting apparatus 100A is positioned on top of the intertwined region, but that the notches 164, 166 may still provide an additional level of securing.

In this regard, the combination of the interlocking assembly 134 setting the total inner width of the sorting apparatus 100, the grooves or cavities 152, 154 within the respective end portions 106A, 112A, and the notches 164, 166 within the respective end portions 106A, 112A allows for the installation of the sorting apparatus 100A on the receptacle and the moving of the sorting apparatus 100A on the receptacle without disengaging from the receptacle and/or from the bags or liners held in place by the sorting apparatus 100A.

The end portions 106A, 112A are contoured to conform to a receptacle. For example, as shown in FIGS. 1-8, the end portions 106A, 112A may include a first contoured surface 170 and a second contoured surface 172 that is inset relative to the first contoured surface 170 and is positionable proximate to or configured to abut against the exterior side of the receptacle, where the receptacle includes an upper lip or edge that projects outward from the exterior sides of the receptacle. The transition between the contoured surfaces 170, 172 may be gradual or sloped, where a transition surface 174 between the contoured surfaces 170, 172 forms non-right angles with the contoured surfaces 170, 172. Alternatively, and without departing from the scope of the present disclosure, the transition between the contoured surfaces 170, 172 may be substantially immediate, where the transition surface 174 between the contoured surfaces 170, 172 forms right angles (or substantially right angles) with the contoured surfaces 170, 172. In one non-limiting example, the notches 164, 166 may be cut into both contoured surfaces 170, 172. It is noted, however, that the notches 164, 166 may be cut into only the first contoured surface 170 or the second contoured surface 172, without departing from the scope of the present disclosure.

FIGS. 9-16 generally show the sorting apparatus 100B, in accordance with aspects of the present disclosure. It is noted aspects and/or components of the sorting apparatus 100B may be shared with and/or combinable with one or more aspects and/or components of the sorting apparatus 100A without departing from the scope of the present disclosure, and vice versa, unless otherwise noted.

In contrast to FIGS. 1-8, in FIGS. 9-16 the sorting apparatus 100B includes a first member 102B with an end portion 106B, and a second member 104B with an end portion 112B. The end portions 106B, 112B are contoured to conform to a receptacle that only includes straight exterior sides (e.g., with no outward-projecting upper lip or edge). The end portions 106B, 112B may include a straight surface 176 that is positionable proximate to or configured to abut against the exterior sides of the receptacle, where the receptacle includes an upper lip or edge that does not protrude outward from the exterior sides of the receptacle.

However, it should be understood that the end portions 106B, 112B including the straight surfaces 176 does not preclude the sorting apparatus 100B from being used on receptacles with outward-projecting upper lip or edge, without departing from the scope of the present disclosure. Rather, the straight surfaces 176 merely would not fully contour to both the upper lip or edge and the exterior sides, but instead would only contour to the upper lip or edge.

Although aspects of the present disclosure illustrate contoured ends in FIG. 1-8 and non-contoured or straight ends in FIGS. 9-16, it is noted the members 102A/102B, 104A/104B of the sorting apparatuses 100A/100B may be interchangeable such that both contoured and non-contoured or straight ends may be usable within the same sorting apparatus 100, without departing from the scope of the present disclosure.

In some aspects, the sorting apparatus 100 may include markings or other indicators 178 on one or more surfaces. For example, the sorting apparatus 100 may include a symbol or words related to which type of waste is intended to go into which side of the receptacle, when the bags or liners were last changed, or other information for assisting a user in determining the status of the waste within the receptacle. It is noted the markings or other indicators 178 may be formed on the surfaces of the sorting apparatus 100, or may be applied by a user during use of the sorting apparatus 100. Where the markings are applied by the user, the sorting apparatus 100 may be modified as desired to represent different types of waste. In this regard, at least a portion of the surfaces may be markable in a permanent or non-permanent fashion (e.g., at least a portion of the surfaces may be markable with pencil, pen, chalk, whiteboard marker, permanent marker, or the like). In addition, it is noted the markings or other indicators 178 may be related to a company producing and/or marketing the sorting apparatus 100. It should be understood that the location of the markings or other indicators in FIGS. 7 and 15 should not be understood as limited to the top surface 122 of the second member 104, by that the markings or other indicators 178 may be on any surface of the sorting apparatus 100 (e.g., the bottom surface 132 of the second member 104 in FIGS. 8 and 16, the top surfaces 160, 162 of the respective end portions 106, 112, or the like). In other aspects, the sorting apparatus 100 may not include any markings or other indicators 178.

As illustrated and described throughout the present disclosure, one or more components of the sorting apparatus 100 (e.g., first member 102, second member 104, adjuster 140, and/or receiver 142) may be formed from various flexible, semi-rigid, or rigid materials. For example, the one or more components of the sorting apparatus 100 may be fabricated from a material including, but not limited to, a synthetic rubber or polymer (e.g., an elastomer such as silicone rubber, or the like), a natural rubber, a plastic of sufficient thinness to allow for bending or flexing, or other material capable of being formed into a flexible structure that has an initial shape, is bendable or flexible into a second shape via application of a force, and can elastically return to the initial shape following removal of the applied force. By way of another example, the one or more components of the sorting apparatus 100 may be fabricated from a material including, but not limited to, a metal, a plastic of sufficient thickness to maintain at least semi-rigidity, a wood, a fibrous structure (e.g., bamboo), a fiberglass, a carbon fiber, a pressed cardboard, or other material capable of being formed into a rigid or semi-rigid structure. For example, one or more components of the sorting apparatus 100 may be fabricated from a recyclable material such as a metal or a plastic. By way of another example, one or more components of the sorting apparatus 100 may be fabricated from a compostable material such as a wood, a fibrous structure, or a pressed cardboard.

As illustrated and described throughout the present disclosure, one or more components of the sorting apparatus 100 (e.g., first member 102, second member 104, adjuster 140, and/or receiver 142) may be fabricated through the use of any fabrication technique including, but not limited to, casting processes (die casting, injection molding, or the like), forming processes (e.g., extrusion, forging, stamping, additive manufacturing processes such as three-dimensional (3D) printing, or the like), cutting processes, joining processes, or the like. It is noted the fabrication processes may occur simultaneously, near-simultaneously, or sequentially where appropriate. For example, one or more components of the sorting apparatus 100 may be simultaneously formed through an additive manufacturing process (with support material removed to allow the sliding of the first member 102 relative to the second member 104, in one non-limiting example, where support material is used). In addition, it is noted the fabrication processes may occur separately on unique portions of the components of the sorting apparatus 100. For example, the engaging portions 106, 112 may be formed with a bend simultaneously with the forming of the overlaid portions 108, 110. By way of another example, the engaging portions 106, 112 may be formed with a bend following the forming of the overlaid portions 108, 110. Further, the notches 164, 166 may be formed in the engaging portions 106, 112 simultaneously with or following the forming of the engaging portions 106, 112.

FIGS. 17-29C show the steps or processes to install the sorting apparatus 100 on a receptacle 200 defining a cavity 202 accessible via an opening 204, as well as multiple bags or liners 206 within the cavity 202 of the receptacle 200, in accordance with aspects of the present disclosure. The design of the sorting apparatus 100 enables the installation of the sorting apparatus 100, and also enables changing the portion of the can that is allocated to one type of waste (e.g., trash) versus a second type of waste (e.g., compostable material).

Operation and use of the sorting apparatus 100 as described throughout the present disclosure may include one or more of the following steps. It is noted that any of the embodiments, aspects, or components of the sorting apparatus 100A and/or 100B may be understood as being included in or performing one or more of the following steps.

Figure 17:
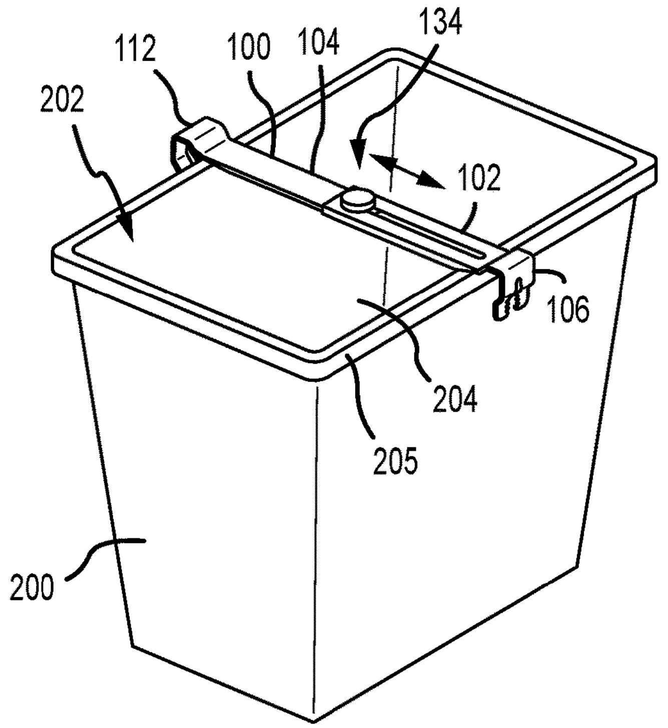
FIG. 17 shows a receptacle and a sorting apparatus in a first configuration, in accordance with aspects of the present disclosure.
Figure 18A:
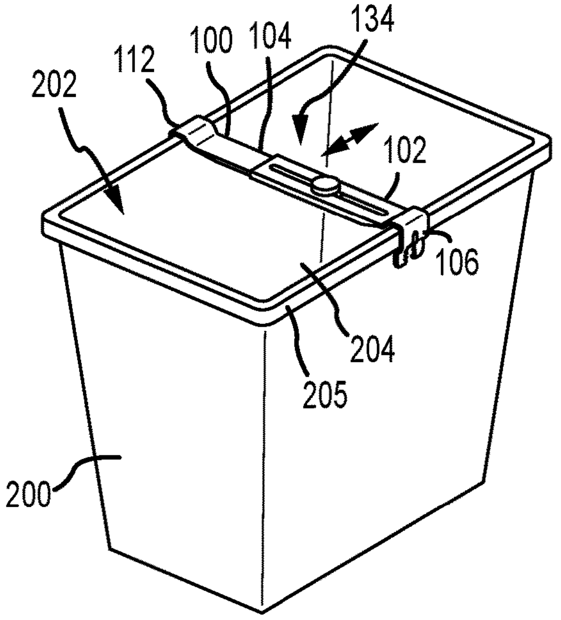
FIG. 18A shows the receptacle and sorting apparatus of FIG. 17 with the sorting apparatus in a second configuration in an unbent or unflexed state, in accordance with aspects of the present disclosure.
Figure 18B:
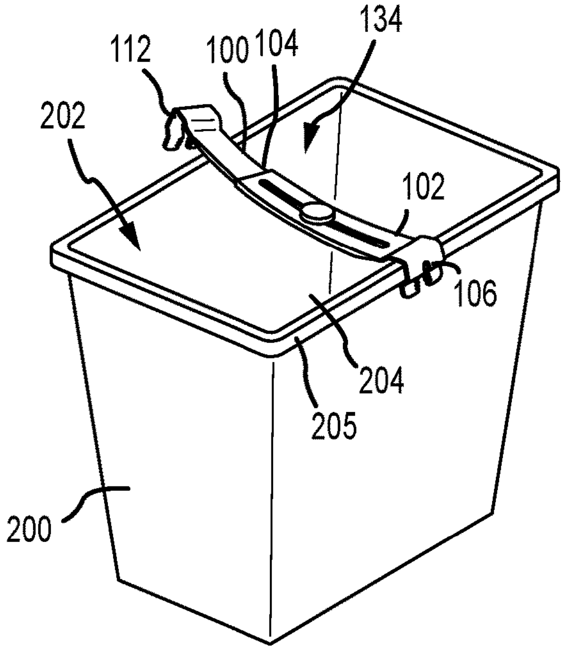
FIG. 18B shows the receptacle and sorting apparatus of FIG. 17 with the sorting apparatus in a second configuration in a bent or flexed state, in accordance with aspects of the present disclosure.

In one or more steps as illustrated in a comparison between FIGS. 17, 18A, and 18B, the sorting apparatus 100 is positioned on the receptacle 200. Referring now to FIGS. 17 and 18A, the interlocking assembly 134 (e.g., the adjuster 140) is loosened (or is already loose) to allow the first member 102 to slide relative to the second member 104 between a first configuration and a second configuration (of two or more or a plurality of configurations). The first member 102 and the second member 104 slide relative to one another until the sorting apparatus 100 engages the first and second opposite sides of an upper lip or edge 205 and/or the first and second opposite exterior sides of the receptacle to define a total inner width between the end portions 106, 112 of the sorting apparatus 100. The interlocking assembly 134 (e.g., the adjuster 140) may then be tightened until the first member 102 cannot slide relative to the second member 104, retaining the dimensions of the total inner width between the end portions 106, 112 and locking the sorting apparatus 100 in a particular configuration. It is noted that the contours of the sorting apparatus 100 cause the overlaid portions 108, 110 of the sorting apparatus 100 to be at least partially seated into the opening 204 leading to the cavity 202 a selected depth.

Referring now to FIGS. 18A and 18B, the sorting apparatus 100 may then be removed from the receptacle 200. For example, the tightened sorting apparatus 100 may be unclipped from the receptacle 200. For instance, where the tightened sorting apparatus 100 is fabricated from a flexible material, and where each member 102, 104 has a thickness that is thin enough to allow for the sorting apparatus 100 to bend or flex, an end portion 106 and/or 112 may unclip from the receptacle 200 after the sorting apparatus 100 is tightened in the set or locked configuration. In this regard, the sorting apparatus 100 does not need to be loosened and reset to remove following setting, but instead may be set, unclipped in the set configuration, and then re-clipped without losing the set configuration. By way of another example, the sorting apparatus 100 may be removed by sliding the sorting apparatus 100 off a first or a second of the opposite ends of the receptacle 200 not engaged by the sorting apparatus 100. In addition, it is noted that the sorting apparatus 100 may engage with the first and second opposite ends of the receptacle 200, as opposed to the first and second opposite sides, without departing from the scope of the present disclosure.

Figure 19:
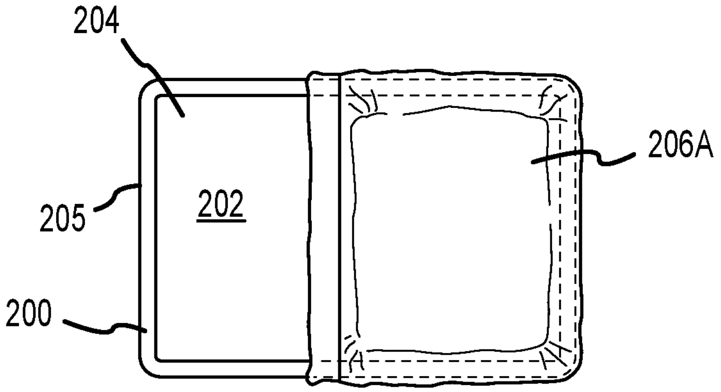
FIG. 19 shows the receptacle of FIG. 17 and a bag or liner, in accordance with aspects of the present disclosure.
Figure 20:
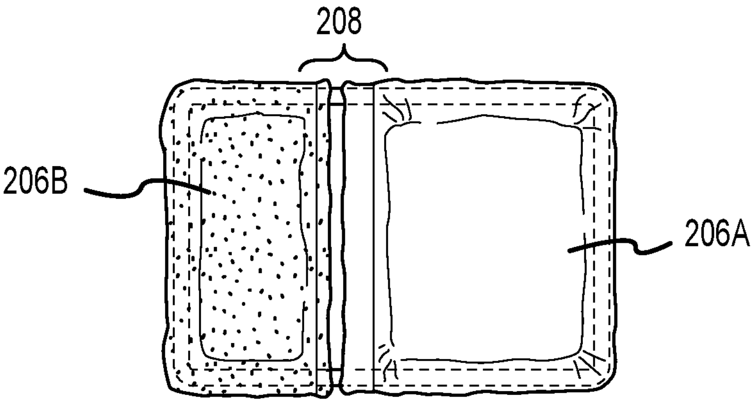
FIG. 20 shows the receptacle and the bag or liner of FIG. 19 with a second bag or liner, in accordance with aspects of the present disclosure.
Figure 21:
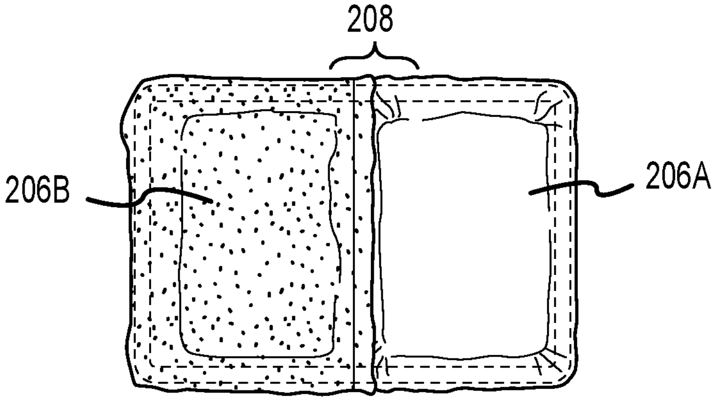
FIG. 21 shows the receptacle and the two bags or liners of FIG. 20, in accordance with aspects of the present disclosure.

In one or more steps as illustrated in a comparison between FIG. 19-21, bags or liners 206 are inserted into the cavity 202 of the receptacle 200. For example, the first bag or liner 206A may be a standard trash bag. As illustrated in FIG. 19, the first bag or liner 206A is positioned to only fill a portion of the cavity 202, such that it is only wrapped around a first end and portions of the first and second opposite sides of the receptacle. The remainder of the opening of the first bag or liner 206A is positioned across the opening 204 to the cavity 202 and over the upper lip or edge 205 of the receptacle 200. Next, as illustrated in FIG. 20, a second bag or liner 206B is positioned to fill the remaining portion of the cavity 202, such that it is only wrapped around a second end opposite the first end and portions of the first and second opposite sides of the receptacle. The remainder of the opening of the second bag or liner 206B is positioned across the opening 204 to the cavity 202, over the top edge of the receptacle, and at least partially overlapping with the portion of the first bag or liner 206A already positioned over the opening 204. Finally, as illustrated in FIG. 21, the overlapping portions 208 of the first bag or liner 206A and the second bag or liner 206B are intertwined (e.g., rolled together, or the like) or otherwise coupled together (e.g., with clips, or the like).

Where the sorting apparatus 100 is used with the receptacle 200, it is noted that installing multiple bags or liners 206 in the cavity 202 defined with the receptacle 200 may remove some ability to secure the bags or liners 206 to the receptacle 200. For example, where a single bag or liner 206 would normally be wrapped over the upper lip or edge 205 of the opening 204 on every side of the receptacle 200, installing multiple bags or liners 206 within the receptacle 200 causes each bag or liner 206 to lose access to at least one of the sides of the upper lip or edges 205 of the opening 204. The sorting apparatus 100 thus is designed to overcome this shortcoming and allow for the securing of multiple bags or liners 206 within the cavity 202, by engaging with the bags or liners 206 (e.g., at the overlapping portions 208).

Although it is illustrated to set the inner total width between the end portions 106, 112 of the sorting apparatus 100 prior to positioning the bags or liners 206, it is noted that the inner total width between the end portions 106, 112 of the sorting apparatus 100 may be set after positioning the bags or liners 206, without departing from the scope of the present disclosure.

Figure 22:
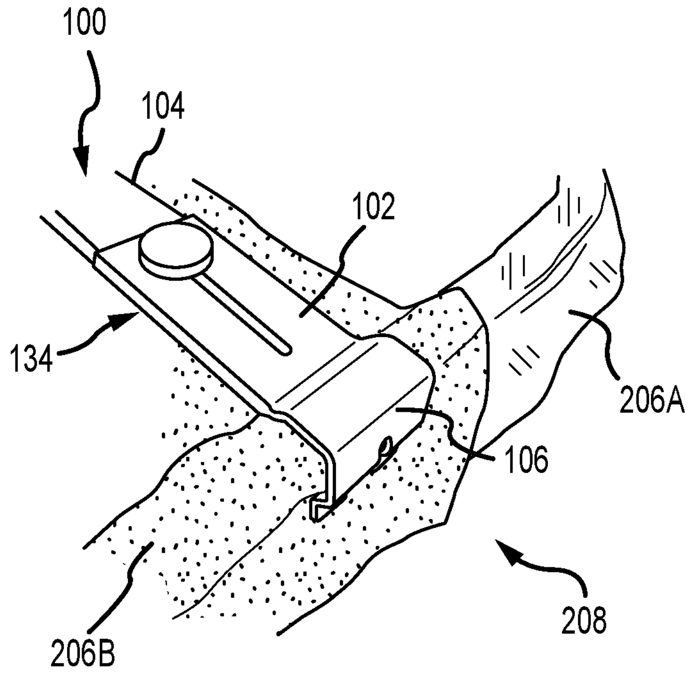
FIG. 22 shows the receptacle and the two bags or liners of FIG. 21, with the sorting apparatus in the second configuration, in accordance with aspects of the present disclosure.
Figure 23:
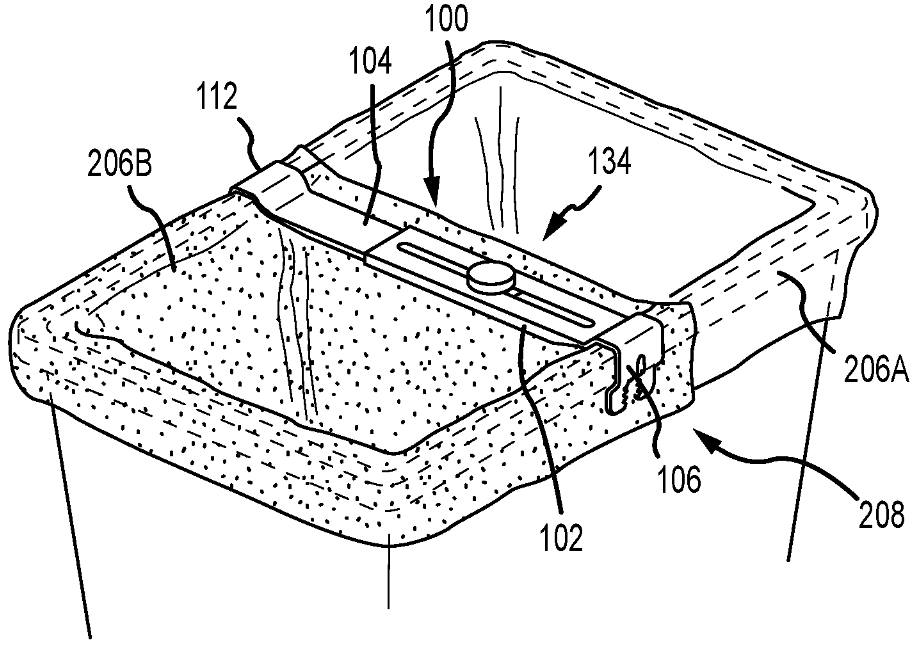
FIG. 23 shows the receptacle, the sorting apparatus, and the two bags or liners of FIG. 22, in accordance with aspects of the present disclosure.

In one or more steps as illustrated in a comparison between FIGS. 22 and 23, a first end portion of the sorting apparatus 100 is coupled to the receptacle 200 above the overlapping portions 208 of the bags or liners 206, and then a second end portion of the sorting apparatus 100 is coupled to the receptacle 200 above the overlapping portions 208 of the bags or liners 206. In one non-limiting example, the end portion 112 of the second member 104 is coupled to the receptacle 200, and then the end portion 106 of the first member 102 is coupled to the receptacle 200. In another non-limiting example, the end portion 106 of the first member 102 is coupled to the receptacle 200, and then the end portion 112 of the first member 104 is coupled to the receptacle 200. In non-limiting examples where the members 102, 104 are fabricated from a flexible material such that the sorting apparatus 100 is bendable or flexible, the end portions 106 and/or 112 may be uncoupled (e.g., unclipped, or the like) from the receptacle 100 and/or re-coupled to the receptacle 100 to reset relative to the bags or liners 206 (and the overlapping portions 208 of the bags or liners 206) without needing to loosen or re-tighten the interlocking assembly 134 once the correct width for the sorting apparatus 100 relative to the receptacle 200 is set.

Figure 24:
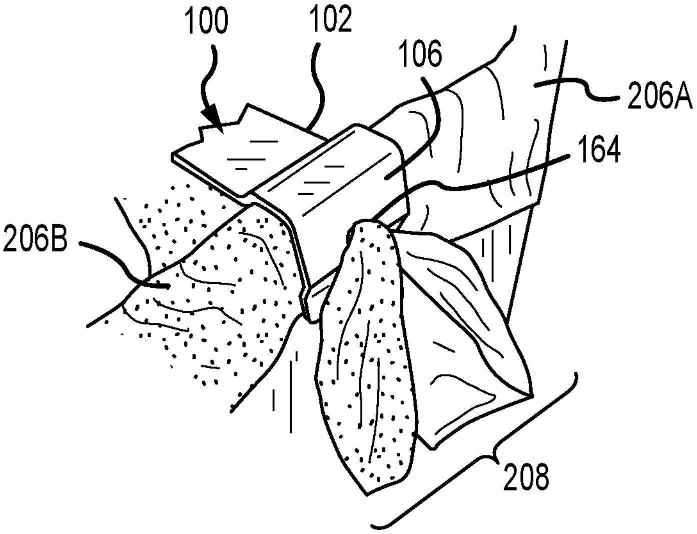
FIG. 24 shows a partial view of the receptacle, the sorting apparatus, and the two bags or liners of FIG. 23, in accordance with aspects of the present disclosure.
Figure 25:
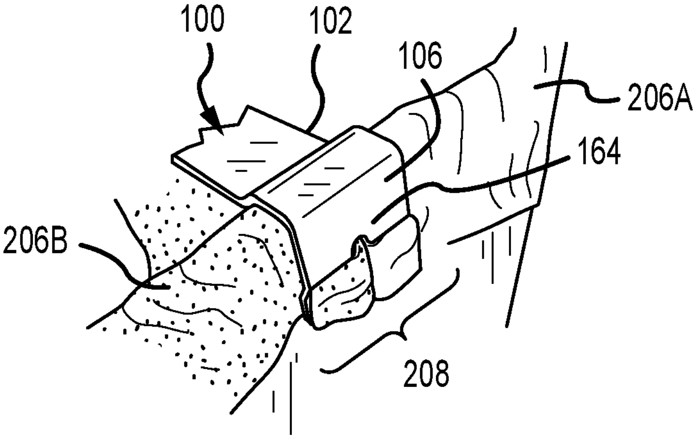
FIG. 25 shows the partial view of the receptacle, the sorting apparatus, and the two bags or liners of FIG. 24, in accordance with aspects of the present disclosure.

In a step as illustrated in FIG. 24, the overlapping portions 208 of the bags or liners 206 may be pulled through the notches 164, 166 of the respective end portions 106, 112 (notch 166 and end portion 112 not shown). In a step, as illustrated in FIG. 25, the overlapping portions 208 of the bags or liners 206 may be tucked or wrapped underneath the end portions 106, 112 (notch 166 and end portion 112 not shown), to further secure the bags or liners 206 underneath the sorting apparatus 100.

Although it is illustrated to set the bags or liners 206 in respective halves of the cavity 202, it is noted that the bags or liners 206 may partition the cavity 202 in any percentage, without departing from the scope of the present disclosure. In a step as illustrated in a comparison between FIGS. 26-28, the sorting apparatus 100 may be re-positioned to adjust the amount or percentage of each bag or liner 206 available to a user by increasing or decreasing the volume of bag or liner 206 within the receptacle 200. Both ends of the sorting apparatus 100 tightly hold the bags or liners 206 together by both the force of the sorting apparatus 100 on top of the bags or liners 206, along with the notches 164, 166 in the respective end portions 106, 112 which hold the bags or liners 206 together on opposite sides of the receptacle 200.

This allows the bags or liners 206 to be securely held together while a user can easily slide the sorting apparatus 100 from side to side while coupled to the receptacle 200, making each side of the divided cavity 202 bigger or smaller depending on which side is being filled with more or less items.

Figure 26:
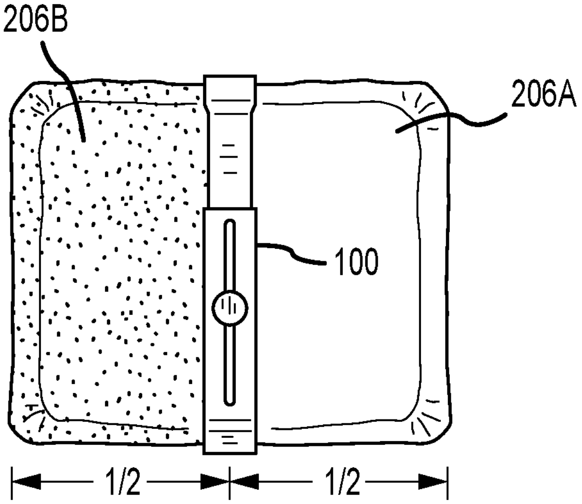
FIG. 26 shows the receptacle, the sorting apparatus, and the two bags or liners of FIG. 23, in accordance with aspects of the present disclosure.
Figure 27:
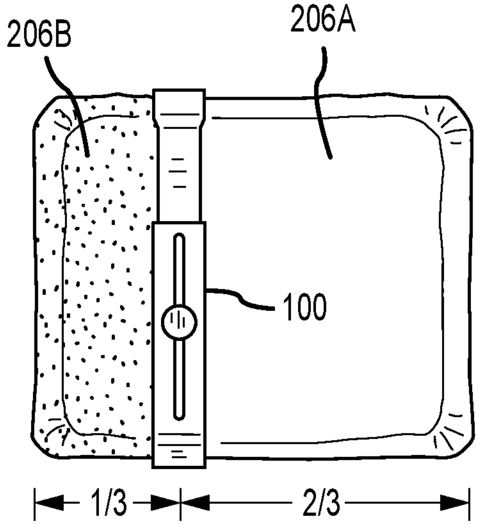
FIG. 27 shows the receptacle, the sorting apparatus, and the two bags or liners of FIG. 23, in accordance with aspects of the present disclosure.
Figure 28:
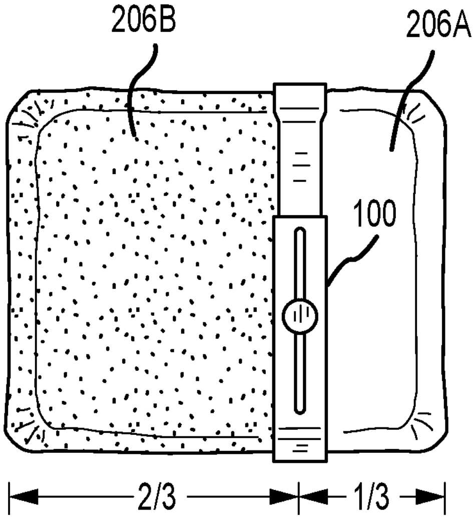
FIG. 28 shows the receptacle, the sorting apparatus, and the two bags or liners of FIG. 23, in accordance with aspects of the present disclosure.

For example, as illustrated in FIG. 26, the first bag or liner 206A and the second bag or liner 206B approximately split the cavity 202 in half. By way of another example, as illustrated in FIG. 27, approximately ⅔ of the cavity 202 is filled with the first bag or liner 206A and approximately ⅓ of the cavity 202 is filled with the second bag or liner 206B. By way of another example, as illustrated in FIG. 28, approximately ⅓ of the cavity 202 is filled with the first bag or liner 206A and approximately ⅔ of the cavity 202 is filled with the second bag or liner 206B. It is noted the re-positioning may occur by sliding the sorting apparatus 100 (and thus the overlapping portions 208 of the bags or liners 206) along the upper lip or edge 205 of the receptacle 200, without needing to uncouple the sorting apparatus 100 from the receptacle 200 and without causing the sorting apparatus 100 to release the bags or liners 206. In addition, it is noted the re-positioning of the sorting apparatus 100 may occur when the bags or liners 206 are empty and/or when they are at least partially filled with respective waste.

In a step as illustrated in FIGS. 29A-29C, a lid 210 is installable on the receptacle 200. The lid 210 fits over the sorting apparatus 100 without interference. It is noted the lid 210 as shown in FIGS. 29A-29C is not intended to be limiting on the present disclosure, and that the form, design, structure, and/or operation of which is merely provided for illustration.

For example, FIG. 29A illustrates a lid 210A that fits entirely over the receptacle 200A, with the entire lid 210A opening to provide access to the bags or liners 206A, 206B within the receptacle 200A. In this example, the sorting apparatus 100 fits between the receptacle 200A and the lid 210A when the lid 210A is closed. The sorting apparatus 100 also does not impede the opening of the entire lid 210B.

By way of another example, FIG. 29B illustrates a removable lid 210B that fits entirely over the receptacle 200B, with only a portion of the lid 210B opening to provide access to the bags or liners 206A, 206B within the receptacle 200B. In this example, the sorting apparatus 100 fits between the receptacle 200B and the lid 210B when the lid 210B is closed. In addition, a portion of the sorting apparatus 100 (e.g., end portions 106, 112) also fits between the receptacle 200B and the lid 210B when a portion of the lid 210B is open. It is noted that the end portion 106 protruding from underneath a bottom edge of a sidewall of the lid 210B, as the end portion 106 is a greater length than a height of the sidewall of the lid 210B, is provided only for illustration and is not intended to be limiting on the present disclosure. For example, the lid 210B may have a sidewall height that is equal to or greater than the length of the end portion 106, such that none of the end portion 106 is visible from underneath the bottom edge of the sidewall of the lid 210B.

By way of another example, FIG. 29C illustrates a lid 210C that fits over an internal receptacle 200C, where the internal receptacle 200C is insertable into an external shell or housing 212, with the entire lid 210C opening to provide access to the bags or liners 206A, 206B within the receptacle 200C. In this example, the sorting apparatus 100 fits between the receptacle 200C and the lid 210C when the lid 210C is closed. In addition, portions of the sorting apparatus 100 (e.g., end portions 106, 112) also fit between the receptacle 200C and the external shell or housing 212 when the lid 210C is open or closed.

As illustrated and described throughout the present disclosure, one or more components of the sorting apparatus 100 (e.g., first member 102, second member 104, adjuster 140, and/or receiver 142) may be fabricated to have a pre-determined contouring and/or dimensioned to have a select thickness (or thinness). In one non-limiting example, the thickness of the first member 102 and/or the second member 104 is thin enough to accommodate receptacles of all shapes, sizes, and/or types. For example, as illustrated in FIG. 29B, the end portions 106 and/or 112 may be at least partially dimensioned with a sufficient thinness to remain fitting between the receptacle 200B and lid 210B regardless of whether the lid 210B is open or closed. By way of another example, as illustrated in FIG. 29C, the end portions 106 and/or 112 may be contoured and may be at least partially dimensioned with a sufficient thinness to remain fitting between the receptacle 200C and lid 210C regardless of whether the lid 210C is open or closed, and remain fitting between the receptacle 200C and the external shell or housing 212 regardless of whether the lid 210C is open or closed.

It is noted that where the end portions 106, 112 are not of the sufficient thinness, a lid 210 will sit on top of the end portions 106, 112 that couple to the upper lips or edges 205 of the receptacle 200, as opposed to enveloping or otherwise wrapping around the upper lips or edges 205 of the receptacle 200. Thus, the end portions 106, 112 need to be of a sufficient thinness for the lid 210 to close properly and without a gap between the lid 210 and the receptacle 200 when the lid 210 is closed. In addition, the end portions 106, 112 need to be of a sufficient thinness for the receptable 200 to fit within the external shell or housing 212, such that the combination of the sorting apparatus 100 and the receptacle 200 does not rest on top of an upper lip or edge 214 of the external shell or housing 212 but instead fits in a cavity defined within the external shell or housing 212.

It is contemplated that either the contoured version 100A or the straight-leg version 100B will work with any of the receptacles 200A, 200B, 200C, where the pre-determined contouring and/or being dimensioned to have the select thickness (or thinness) is incorporated into the design of the sorting apparatus 100.

Although FIGS. 17-29C illustrate the installation of a single sorting apparatus 100, it is noted that multiple sorting apparatuses 100 may be installed without departing from the scope of the present disclosure. One or more of the above steps may be repeated to install the additional sorting apparatuses 100 (and desired bags or liners 106). It is noted that this may allow for three or more sections within the cavity 202 to further separate waste (e.g., separate sections for trash, compostable material, recyclables, and the like).

Although FIGS. 17-29C illustrate the securing of multiple bags or liners 206 within the receptacle 200, it is noted that only one bag or liner 206 may be secured to the receptacle 200 by multiple sorting apparatuses 100, without departing from the scope of the present disclosure. It is noted that this may allow for suspending a bag or liner 206 within the cavity 202 and defining a first section in the middle of the cavity 202, such that additional sections of the cavity 202 are defined on both sides of the first section.

Although FIGS. 17-29C illustrate the securing of multiple bags or liners 206 within the receptacle 200, it is noted that only one bag or liner 206 may be secured to the receptacle 200 by the sorting apparatus 100, and the remainder of the cavity 202 within the receptacle 200 may be left un-lined, without departing from the scope of the present disclosure. In one non-limiting example, it may not be necessary or required to line both portions of the cavity 202 where a first section for compostable material or trash, and a second section is for pre-cleaned recyclables. In this example, the volume of the separate sections may still be altered by sliding the sorting apparatus 100 along the respective upper lips or edges of the receptacle 200.

Although FIGS. 17-29C illustrate the sorting apparatus 100A (e.g., the contoured surfaces 170, 172 of the end portion 112, as shown in FIG. 25), it is noted that the sorting apparatus 100B may similarly be used to secure the bags or liners 206 within the receptacle 200, without departing from the scope of the present disclosure.

Any of the steps, functions, and operations discussed herein can be performed continuously and automatically.

While the steps have been discussed and illustrated in relation to a particular sequence of events, it should be appreciated that changes, additions, and omissions to this sequence can occur without materially affecting the operation of the disclosed embodiments, configuration, and aspects.

Although FIGS. 1-8, 9-16, and 17-29C are largely shown in solid lines, it should be understood that one or more aspects of the sorting apparatus 100 may not form part of the claimed invention or design but rather is only a portion of an environment surrounding the claimed invention or design and/or a portion of an environment in which the claimed invention or design operates. In one non-limiting example, any or all of the rails 114, 116, 124, 126, components of the interlocking assembly 134 (e.g., the slots or apertures 136, 138, the adjuster 140, the receiver 142), the notches 164, 166, and/or the markings or other indicators 178 may not form part of the claimed invention or design but rather is only a portion of an environment surrounding the claimed invention or design and/or a portion of an environment in which the claimed invention or design operates. In another non-limiting example, any or all of the receptacle 200, the bags or liners 206, and/or the lid 210 may not form part of the claimed invention or design but rather is only a portion of an environment surrounding the claimed invention or design and/or a portion of an environment in which the claimed invention or design operates. Therefore, the description through the present disclosure should not be interpreted as a limitation on the scope of the present disclosure but merely an illustration.

The exemplary systems and methods of this disclosure have been described in relation to the sorting apparatus 100, the receptacle 200 (with optional lid 210), and the bags or liners 206. However, to avoid unnecessarily obscuring the present disclosure, the preceding description may omit a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In addition, it would be possible to combine some features of the disclosure without combining all.

References in the specification to "being operable" or "is operable" may be understood as "being configured to" or "is configured to, "being capable of" or "is capable of," and the like.

References in the specification to "an aspect," "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects are directed toward:

A sorting apparatus for a receptacle, comprising:

- a first member comprising a first end portion at a first proximal end and a first overlaid portion at a first distal end; and a second member comprising a second overlaid portion at a second proximal end and a second end portion at a second distal end, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, wherein both the first end portion and the second end portion engage the respective upper edge of the opening of the receptacle when the sorting apparatus is in the second configuration to secure the sorting apparatus to the receptacle, wherein securing the sorting apparatus to the receptacle retains a first bag between the sorting apparatus and the receptacle and within a first portion of a cavity defined within the receptacle that is accessible via the opening of the receptacle, and wherein securing the sorting apparatus to the receptacle retains a second bag between the sorting apparatus and the receptacle and within a second portion of the cavity defined within the receptacle.

Any one or more of the above aspects include the sorting apparatus further comprising an interlocking assembly adjustable between an unlocked configuration and a locked configuration, wherein the first overlaid portion of the first member is able to slide relative to the second overlaid portion of the second member between the first configuration and the second configuration when the interlocking assembly is in the unlocked configuration, and wherein the first overlaid portion of the first member is unable to slide relative to the second overlaid portion of the second member between the first configuration and the second configuration when the interlocking assembly is in the locked configuration.

Any one or more of the above aspects include wherein at least one of the first member and the second member are fabricated from a flexible material that allows for an uncoupling of the respective first end portion or second end portion from the receptacle while the interlocking assembly is in the locked configuration.

Any one or more of the above aspects include wherein the interlocking assembly comprises:

a slot in the first member;

an aperture in the second member;

an adjuster operable to pass through the slot in the first member and the aperture in the second member; and a receiver operable to receive and engage with the adjuster following the adjuster passing through the first member and the second member.

Any one or more of the above aspects include wherein the adjuster is insertable into the slot from a top surface of the first member, wherein the receiver is operable to engage with a bottom surface of the second member to prevent rotation of the receiver relative to the second member, and wherein engaging the bottom surface of the second member with the receiver prevents rotation of the receiver when engaging with the adjuster.

Any one or more of the above aspects include the sorting apparatus further comprising:

at least a first rail on the first member; and at least a second rail on the second member;

wherein the at least a first rail on the first member and the at least a second rail on the second member are operable to guide the sliding of the first member relative to the second member when the sorting apparatus is in the first configuration.

Any one or more of the above aspects include wherein the at least a first rail includes a first rail and a second rail extending downward from a first top surface of the first member, and wherein the at least a second rail includes a third rail and a fourth rail extending downward from a second top surface of the second member.

Any one or more of the above aspects include wherein a total inner width of the first member as defined by a first width of a bottom surface of the first member is greater than an outer total width as defined by a second width of the second top surface of the second member and respective thicknesses of the third rail and the fourth rail.

Any one or more of the above aspects include wherein the first end portion defines a first groove and the second end portion defines a second groove in which the respective upper edges of the receptacle fit within to secure the sorting apparatus to the receptacle when the sorting apparatus is in the second configuration.

Any one or more of the above aspects include wherein at least one of the first end portion and the second end portion comprises:

a first contoured surface;

a second contoured surface; and a transition surface between the first contoured surface and the second contoured surface.

Any one or more of the above aspects include wherein the first contoured surface engages an exterior surface of the respective upper edge of the receptable, and wherein the second contoured surface engages a respective exterior side of the receptacle below the respective upper edge of the receptacle.

Any one or more of the above aspects include wherein at least one of the first end portion and the second end portion comprises a straight surface configured to engage a respective upper edge of the receptacle.

Any one or more of the above aspects include wherein at least one of the first member and the second member comprises a transition surface between the respective overlaid portions and the respective end portions, and wherein the transition surface between the respective overlaid portion and the respective end portion lowers the respective overlaid portion a respective selected depth into the cavity defined within the receptacle.

Any one or more of the above aspects include wherein at least one of the first end portion and the second end portion includes a notch, wherein the notch is operable to receive a portion of at least one of the first bag and the second bag when the sorting apparatus is secured to the receptacle, and wherein the notch includes an edge operable to engage and secure the portion of the at least one of the first bag and the second bag within the notch when the sorting apparatus is secured to the receptable.

Any one or more of the above aspects include wherein the sorting apparatus is slidable between a first position and a second position along the respective upper edges of the receptacle when the sorting apparatus is secured to the receptacle in the second configuration, and wherein: sliding the sorting apparatus between the first position and the second position increases a volume of the first bag and decreases a volume of the second bag; or sliding the sorting apparatus between the first position and the second position increases a volume of the second bag and decreases a volume of the first bag.

Exemplary aspects are directed toward:

A system for separating a receptacle into multiple sections, comprising:

a first bag; and a sorting apparatus operable to be secured to the receptacle, the sorting apparatus comprising:

a first member comprising a first end portion at a first proximal end and a first overlaid portion at a first distal end; and a second member comprising a second overlaid portion at a second proximal end and a second end portion at a second distal end, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, and wherein both the first end portion and the second end portion engage the respective upper edge of the opening of the receptacle when the sorting apparatus is in the second configuration to secure the sorting apparatus to the receptacle, wherein securing the sorting apparatus to the receptacle retains the first bag between the sorting apparatus and the receptacle and within a first portion of a cavity defined within the receptacle that is accessible via the opening of the receptacle, and wherein securing the sorting apparatus to the receptacle retains a second bag between the sorting apparatus and the receptacle and within a second portion of the cavity defined within the receptacle.

Any one or more of the above aspects include wherein at least one of the receptacle and the second bag is provided with the first bag and the sorting apparatus.

Exemplary aspects are directed toward:

A system for separating waste, comprising:

a receptacle;

a first bag and a second bag; and a sorting apparatus operable to be secured to the receptacle, the sorting apparatus comprising:

a first member comprising a first end portion at a first proximal end and a first overlaid portion at a first distal end; and a second member comprising a second overlaid portion at a second proximal end and a second end portion at a second distal end, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, and wherein both the first end portion and the second end portion engage the respective upper edge of the opening of the receptacle when the sorting apparatus is in the second configuration to secure the sorting apparatus to the receptacle, wherein securing the sorting apparatus to the receptacle retains the first bag between the sorting apparatus and the receptacle and within a first portion of a cavity defined within the receptacle that is accessible via the opening of the receptacle, and wherein securing the sorting apparatus to the receptacle retains the second bag between the sorting apparatus and the receptacle and within a second portion of the cavity defined within the receptacle.

Any one or more of the above aspects include the system further comprising a lid operable to be installed on the receptacle, wherein the first end portion and the second end portion of the sorting apparatus are each at least partially dimensioned with a select thinness to fit between the receptacle and the lid, such that the lid at least partially envelops the sorting apparatus and the receptacle when the sorting apparatus is installed on the receptacle.

Any one or more of the above aspects include the system further comprising a housing operable to receive the receptacle, wherein the first end portion and the second end portion of the sorting apparatus are each at least partially dimensioned with a select thinness to fit between the housing and the receptacle, and wherein the sorting apparatus is at least partially positioned between the housing and the receptacle when the sorting apparatus is installed on the receptacle and when the receptacle is installed within the housing.

Any one or more of the above aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items. The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The transitional phrase "consisting of" excludes any element, step, or ingredient not specified in the claim, but does not exclude additional components or steps that are unrelated to the disclosure such as impurities ordinarily associated therewith. The transitional phrase "consisting essentially of" limits the scope of a claim to the specified materials or steps and those that do not materially affect the basic and novel characteristic(s) of the claimed invention.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as $X_1$-$X_n$, $Y_1$-$Y_m$, and $Z_1$-$Z_0$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_0$).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

Unless otherwise indicated, all numbers expressing quantities, dimensions, conditions, ratios, ranges, and so forth used in the specification and claims are to be understood as being modified in all instances by the term "about" or "approximately." Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A sorting apparatus for a receptacle, comprising:

a first member comprising a first end portion at a first proximal end and a first overlaid portion at a first distal end, wherein the first end portion is configured to at least partially wrap around an upper edge of the receptacle; and a second member comprising a second overlaid portion at a second proximal end and a second end portion at a second distal end, wherein the second end portion is configured to at least partially wrap around the upper edge of the receptacle, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, wherein both the first end portion and the second end portion engage the respective upper edge of the opening of the receptacle when the sorting apparatus is in the second configuration to secure the sorting apparatus to the receptacle, wherein securing the sorting apparatus to the receptacle retains respective portions of a first bag between the first end portion of the sorting apparatus and the upper edge of the receptacle, and the second end portion of the sorting apparatus and the upper edge of the receptacle, and within a first portion of a cavity defined within the receptacle that is accessible via the opening of the receptacle, wherein securing the sorting apparatus to the receptacle retains respective portions of a second bag between the first end portion of the sorting apparatus and the upper edge of the receptacle, and the second end portion of the sorting apparatus and the upper edge of the receptacle, and within a second portion of the cavity defined within the receptacle that is accessible via the opening of the receptacle, and wherein both the first end portion and the second end portion include a notch configured to hold a portion of one or more of the first bag and the second bag.

2. The sorting apparatus of claim 1, further comprising an interlocking assembly adjustable between an unlocked configuration and a locked configuration, wherein the first overlaid portion of the first member is able to slide relative to the second overlaid portion of the second member between the first configuration and the second configuration when the interlocking assembly is in the unlocked configuration, and wherein the first overlaid portion of the first member is unable to slide relative to the second overlaid portion of the second member between the first configuration and the second configuration when the interlocking assembly is in the locked configuration.

3. The sorting apparatus of claim 2, wherein at least one of the first member and the second member are fabricated from a flexible material that allows for an uncoupling of the respective first end portion or second end portion from the receptacle while the interlocking assembly is in the locked configuration.

4. The sorting apparatus of claim 1, wherein the interlocking assembly comprises:

a slot in the first member;

an aperture in the second member;

an adjuster operable to pass through the slot in the first member and the aperture in the second member; and a receiver operable to receive and engage with the adjuster following the adjuster passing through the first member and the second member.

5. The sorting apparatus of claim 4, wherein the adjuster is insertable into the slot from a top surface of the first member, wherein the receiver is operable to engage with a bottom surface of the second member to prevent rotation of the receiver relative to the second member, and wherein engaging the bottom surface of the second member with the receiver prevents rotation of the receiver when engaging with the adjuster.

6. The sorting apparatus of claim 1, further comprising:

at least a first rail on the first member; and at least a second rail on the second member;

wherein the at least a first rail on the first member and the at least a second rail on the second member are operable to guide the sliding of the first member relative to the second member when the sorting apparatus is in the first configuration.

7. The sorting apparatus of claim 6, wherein the at least a first rail includes a first rail and a second rail extending downward from a first top surface of the first member, and wherein the at least a second rail includes a third rail and a fourth rail extending downward from a second top surface of the second member.

8. The sorting apparatus of claim 7, wherein a total inner width of the first member as defined by a first width of a bottom surface of the first member is greater than an outer total width as defined by a second width of the second top surface of the second member and respective thicknesses of the third rail and the fourth rail.

9. The sorting apparatus of claim 1, wherein the first end portion defines a first groove and the second end portion defines a second groove in which the respective upper edges of the receptacle fit within to secure the sorting apparatus to the receptacle when the sorting apparatus is in the second configuration.

10. The sorting apparatus of claim 1, wherein at least one of the first end portion and the second end portion comprises:

a first contoured surface configured to rest on an outside and below the upper edge of the receptacle;

a second contoured surface configured to be below the upper edge of the receptacle; and a transition surface between the first contoured surface and the second contoured surface.

11. The sorting apparatus of claim 10, wherein the first contoured surface engages an exterior surface of the respective upper edge of the receptable, and wherein the second contoured surface engages a respective exterior side of the receptacle below the respective upper edge of the receptacle.

12. The sorting apparatus of claim 1, wherein at least one of the first end portion and the second end portion comprises a straight surface configured to engage a respective upper edge of the receptacle.

13. The sorting apparatus of claim 1, wherein at least one of the first member and the second member comprises a transition surface between the respective overlaid portions and the respective end portions, and wherein the transition surface between the respective overlaid portion and the respective end portion lowers the respective overlaid portion a respective selected depth into the cavity defined within the receptacle.

14. The sorting apparatus of claim 1, wherein at least one of the first end portion and the second end portion includes the notch, wherein the notch is operable to receive the portion of at least one of the first bag and the second bag when the sorting apparatus is secured to the receptacle, and wherein the notch includes an edge operable to engage and secure the portion of the at least one of the first bag and the second bag within the notch when the sorting apparatus is secured to the receptable.

15. The sorting apparatus of claim 1, wherein the sorting apparatus is slidable between a first position and a second position along the respective upper edges of the receptacle when the sorting apparatus is secured to the receptacle in the second configuration, and wherein:

sliding the sorting apparatus between the first position and the second position increases a volume of the first bag and decreases a volume of the second bag; or sliding the sorting apparatus between the first position and the second position increases a volume of the second bag and decreases a volume of the first bag.

16. A system for separating a receptacle into multiple sections, comprising:

a first bag; and a sorting apparatus operable to be secured to the receptacle, the sorting apparatus comprising:

a first member comprising a first end portion at a first proximal end and a first overlaid portion at a first distal end, wherein the first end portion is configured to at least partially wrap around an upper edge of the receptacle; and a second member comprising a second overlaid portion at a second proximal end and a second end portion at a second distal end, wherein the second end portion is configured to at least partially wrap around the upper edge of the receptacle, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, and wherein both the first end portion and the second end portion engage the respective upper edge of the opening of the receptacle when the sorting apparatus is in the second configuration to secure the sorting apparatus to the receptacle, wherein securing the sorting apparatus to the receptacle retains respective portions of the first bag between the first end portion of the sorting apparatus and the upper edge of the receptacle, and the second end portion of the sorting apparatus and the upper edge of the receptacle, and within a first portion of a cavity defined within the receptacle that is accessible via the opening of the receptacle, wherein securing the sorting apparatus to the receptacle retains respective portions of a second bag between the first end portion of the sorting apparatus and the upper edge of the receptacle, and the second end portion of the sorting apparatus and the upper edge of the receptacle, and within a second portion of the cavity defined within the receptacle that is accessible via the opening of the receptacle, and wherein both the first end portion and the second end portion include a notch configured to hold a portion of one or more of the first bag and the second bag.

17. The system of claim 16, wherein at least one of the receptacle and the second bag is provided with the first bag and the sorting apparatus.

18. A system for separating waste, comprising:

a receptacle;

a first bag and a second bag; and a sorting apparatus operable to be secured to the receptacle, the sorting apparatus comprising:

a first member comprising a first end portion at a first proximal end and a first overlaid portion at a first distal end, wherein the first end portion is configured to at least partially wrap around an upper edge of the receptacle; and a second member comprising a second overlaid portion at a second proximal end and a second end portion at a second distal end, wherein the second end portion is configured to at least partially wrap around the upper edge of the receptacle, wherein the first member is couplable to the second member, wherein the first overlaid portion of the first member is able to slide relative to the second overlaid portion of the second member between a first configuration and a second configuration for the sorting apparatus, wherein at least one of the first end portion and the second end portion are disengaged from a respective upper edge of an opening of the receptacle when the sorting apparatus is in the first configuration, and wherein both the first end portion and the second end portion engage the respective upper edge of the opening of the receptacle when the sorting apparatus is in the second configuration to secure the sorting apparatus to the receptacle, wherein securing the sorting apparatus to the receptacle retains respective portions of a first bag between the first end portion of the sorting apparatus and the upper edge of the receptacle, and the second end portion of the sorting apparatus and the upper edge of the receptacle, and within a first portion of a cavity defined within the receptacle that is accessible via the opening of the receptacle, wherein securing the sorting apparatus to the receptacle retains respective portions of a second bag between the first end portion of the sorting apparatus and the upper edge of the receptacle, and the second end portion of the sorting apparatus and the upper edge of the receptacle, and within a second portion of the cavity defined within the receptacle that is accessible via the opening of the receptacle, and wherein both the first end portion and the second end portion include a notch configured to hold a portion of one or more of the first bag and the second bag.

19. The system of claim 18, further comprising:

a lid operable to be installed on the receptacle, wherein the first end portion and the second end portion of the sorting apparatus are each at least partially dimensioned with a select thinness to fit between the receptacle and the lid, and wherein the lid at least partially envelops the sorting apparatus and the receptacle when the sorting apparatus is installed on the receptacle.

20. The system of claim 18, further comprising:

a housing operable to receive the receptacle, wherein the first end portion and the second end portion of the sorting apparatus are each at least partially dimensioned with a select thinness to fit between the housing and the receptacle, and wherein the sorting apparatus is at least partially positioned between the housing and the receptacle when the sorting apparatus is installed on the receptacle and when the receptacle is installed within the housing.

* * * * *